(12) United States Patent
Tsujimura et al.

(10) Patent No.: US 7,276,110 B2
(45) Date of Patent: *Oct. 2, 2007

(54) CYAN INK AND INK SET

(75) Inventors: Masashi Tsujimura, Kawasaki (JP);
Mikio Sanada, Yokohama (JP);
Yasuhiro Nito, Yokohama (JP);
Sadayuki Sugama, Tsukuba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/313,806

(22) Filed: Dec. 22, 2005

(65) Prior Publication Data

US 2006/0096498 A1 May 11, 2006

Related U.S. Application Data

(63) Continuation of application No. PCT/JP2005/012295, filed on Jun. 28, 2005.

(30) Foreign Application Priority Data

Jun. 28, 2004 (JP) .............................. 2004-190545

(51) Int. Cl.
*C09D 11/02* (2006.01)

(52) U.S. Cl. ................................. 106/31.27; 106/31.6

(58) Field of Classification Search ............. 106/31.27, 106/31.6

See application file for complete search history.

(56) References Cited

U.S. PATENT DOCUMENTS

| 5,451,251 | A | 9/1995 | Mafune et al. ........... 106/22 H |
| 5,571,313 | A | 11/1996 | Mafune et al. ........... 106/22 H |
| 5,911,815 | A | 6/1999 | Yamamoto et al. ....... 106/31.27 |
| 6,027,210 | A | 2/2000 | Kurabayashi et al. ....... 347/100 |
| 6,062,674 | A | 5/2000 | Inui et al. ...................... 347/43 |
| 6,174,354 | B1 | 1/2001 | Takizawa et al. ......... 106/31.43 |
| 6,221,141 | B1 | 4/2001 | Takada et al. .............. 106/31.6 |
| 6,280,513 | B1 | 8/2001 | Osumi et al. ............... 106/31.6 |
| 6,332,919 | B2 | 12/2001 | Osumi et al. ............... 106/31.6 |
| 6,375,317 | B1 | 4/2002 | Osumi et al. ............... 347/100 |

(Continued)

FOREIGN PATENT DOCUMENTS

JP        10-279869        10/1998

(Continued)

*Primary Examiner*—J. A. Lorengo
*Assistant Examiner*—Veronica Faison-Gee
(74) *Attorney, Agent, or Firm*—Fitzpatrick, Cella, Harper & Scinto

(57) ABSTRACT

A cyan ink applicable to an ink set has plurality of aqueous inks each containing at least: water; a water-insoluble coloring material; and plurality of water-soluble organic solvents including a good medium or good mediums for the water-insoluble coloring material and a poor medium or poor mediums for the water-insoluble coloring material. A ratio of a poor medium to a good medium in the cyan ink is in a specific range. A water-soluble organic solvent showing the maximum Ka value out of respective Ka values of the plurality of water-soluble organic solvents is the poor medium. A ratio of a poor medium to a good medium in an arbitrary aqueous ink in the ink set except the cyan ink and the ratio of the poor medium to the good medium in the cyan ink satisfy a specific relationship.

5 Claims, 8 Drawing Sheets

U.S. PATENT DOCUMENTS

| | | | |
|---|---|---|---|
| 6,387,168 B1 | 5/2002 | Koitabashi et al. | 106/31.6 |
| 6,425,662 B1 | 7/2002 | Teraoka et al. | 347/100 |
| 6,498,222 B1* | 12/2002 | Kitamura et al. | 526/307.2 |
| 6,511,534 B1 | 1/2003 | Mishina et al. | 106/31.33 |
| 6,641,652 B2* | 11/2003 | Ouchi et al. | 106/31.6 |
| 6,706,105 B2 | 3/2004 | Takada et al. | 106/31.6 |
| 6,770,331 B1 | 8/2004 | Mielke et al. | 427/496 |
| 6,874,881 B2 | 4/2005 | Suzuki et al. | 347/100 |
| 6,929,362 B2 | 8/2005 | Takada et al. | 347/100 |
| 6,932,465 B2 | 8/2005 | Nito et al. | 347/96 |
| 6,935,732 B2 | 8/2005 | Takada et al. | 347/96 |
| 7,005,461 B2 | 2/2006 | Sanada et al. | 523/160 |
| 7,029,109 B2 | 4/2006 | Shirota et al. | 347/100 |
| 7,055,943 B2 | 6/2006 | Suzuki et al. | 347/100 |
| 7,128,779 B2 | 10/2006 | Osumi et al. | 106/31.52 |
| 7,144,449 B2 | 12/2006 | Udagawa et al. | 106/31.16 |
| 7,160,376 B2 | 1/2007 | Watanabe et al. | 106/31.6 |
| 2004/0252172 A1* | 12/2004 | Hiraoka et al. | 347/100 |
| 2005/0005818 A1 | 1/2005 | Sato et al. | 106/31.27 |
| 2005/0024458 A1* | 2/2005 | Sanada et al. | 347/100 |
| 2005/0088501 A1* | 4/2005 | Nagashima et al. | 347/100 |
| 2005/0219341 A1 | 10/2005 | Nito et al. | 347/100 |
| 2005/0282930 A1* | 12/2005 | Fu et al. | 523/160 |
| 2006/0000386 A1 | 1/2006 | Hakamada et al. | 106/31.13 |
| 2006/0007288 A1 | 1/2006 | Takada et al. | 347/100 |
| 2006/0007289 A1 | 1/2006 | Nito et al. | 347/100 |
| 2006/0012657 A1 | 1/2006 | Nagashima et al. | 347/100 |
| 2006/0066699 A1* | 3/2006 | Tokuda et al. | 347/100 |
| 2006/0089424 A1 | 4/2006 | Sanada et al. | 523/160 |
| 2006/0098067 A1 | 5/2006 | Imai et al. | 347/100 |
| 2006/0098068 A1* | 5/2006 | Hakamada et al. | 347/100 |
| 2006/0100311 A1 | 5/2006 | Tokuda et al. | 523/160 |
| 2006/0103703 A1 | 5/2006 | Nito et al. | 347/100 |
| 2006/0103704 A1* | 5/2006 | Hakamada et al. | 347/100 |
| 2006/0125895 A1 | 6/2006 | Nito et al. | 347/100 |
| 2006/0125896 A1 | 6/2006 | Aikawa et al. | 347/100 |
| 2006/0135647 A1 | 6/2006 | Ichinose et al. | 523/160 |
| 2006/0137570 A1 | 6/2006 | Osumi et al. | 106/31.27 |
| 2006/0139428 A1 | 6/2006 | Osumi et al. | 347/100 |
| 2006/0139429 A1 | 6/2006 | Osumi et al. | 347/100 |
| 2006/0142417 A1 | 6/2006 | Kaneko et al. | 523/160 |
| 2006/0192827 A1 | 8/2006 | Takada et al. | 347/100 |
| 2006/0194056 A1 | 8/2006 | Nagashima et al. | 428/403 |
| 2006/0194897 A1 | 8/2006 | Kawabe et al. | 523/160 |

FOREIGN PATENT DOCUMENTS

| | | |
|---|---|---|
| JP | 11-124527 | 5/1999 |
| JP | 2000-63719 | 2/2000 |
| JP | 2000-198955 | 7/2000 |
| JP | 2001-11348 | 1/2001 |
| JP | 2003-507517 | 2/2003 |
| JP | 2005-206615 | 8/2005 |
| WO | WO 01/51566 A1 | 7/2001 |

* cited by examiner

FIG. 8A
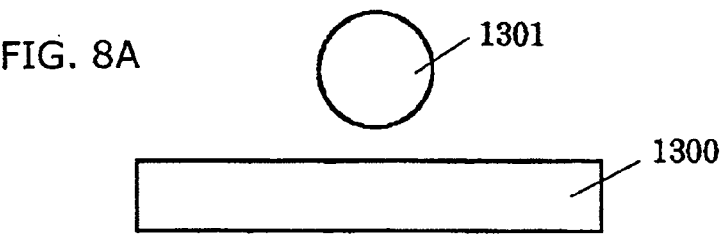 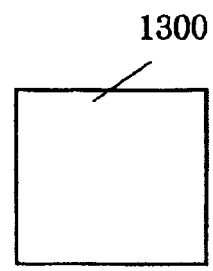
FIG. 8B
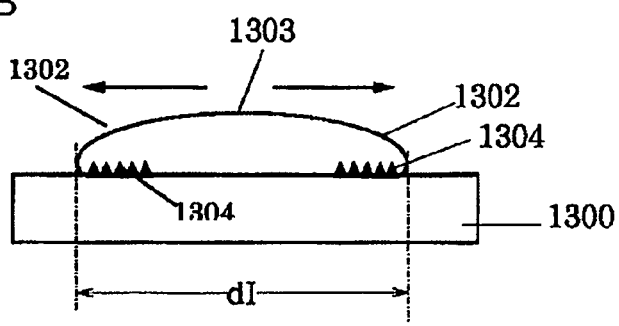 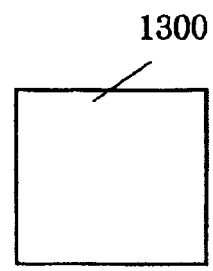
FIG. 8C
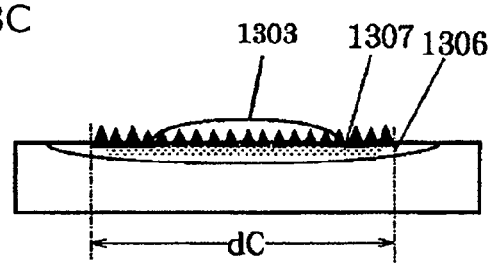 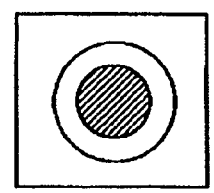
FIG. 8D
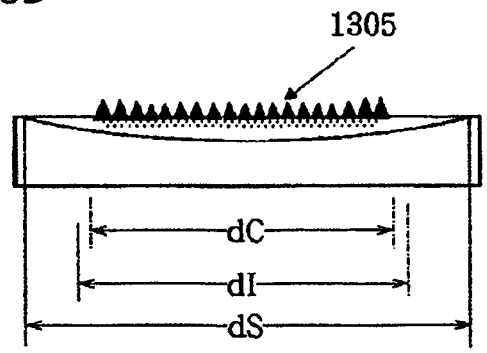 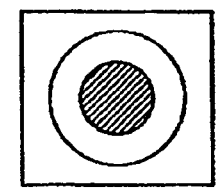

FIG. 10A
FIG. 10B
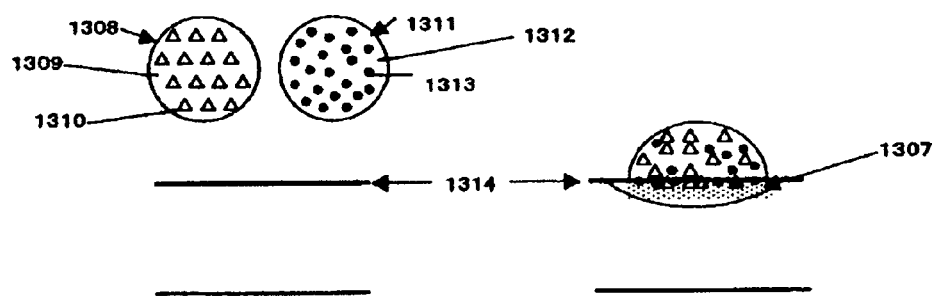
FIG. 10C
FIG. 10D
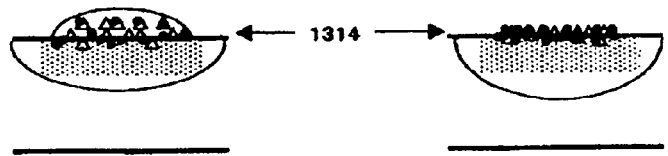 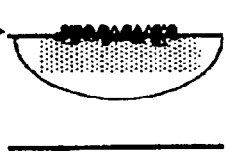

CYAN INK AND INK SET

This application is a continuation of International Application No. PCT/JP2005/012295, filed on Jun. 28, 2005, which claims the benefit of Japanese Patent Application No. 2004-190545 filed on Jun. 28, 2004.

BACKGROUND OF THE INVENTION

1. Field of the Invention

The present invention relates to: a cyan ink containing a water-insoluble coloring material; and an ink set having the same. More specifically, the present invention relates to a cyan ink suitable for an ink-jet recording method.

2. Related Background Art

Ink containing, as a coloring agent, a water-insoluble coloring material such as a pigment (pigment ink) has been conventionally known to provide an image excellent in fastness such as water resistance and light resistance. Various techniques have been recently proposed for the purpose of increasing the image density of an image formed by means of such ink.

For example, there has been proposed the use of ink containing self-dispersion carbon black and a specific salt to achieve an additional increase in image density (see, for example, Japanese Patent Application Laid-open No. 2000-198955). A technique has also been proposed, which involves: causing ink-jet recording ink, which is a composition containing a pigment, polymer fine particles, a water-soluble organic solvent, and water, and a polyvalent metal salt-containing aqueous solution to adhere to a recording medium; and causing the ink composition and the polyvalent metal salt-containing aqueous solution to react with each other to form a high-quality image (see, for example, Japanese Patent Application Laid-open No. 2000-63719). In each of those techniques, a pigment present in ink in a dispersed state is forcedly flocculated at the surface of a recording medium to suppress the permeation of the pigment into the recording medium, thereby obtaining an image with an increased density.

In addition, pigment ink causes a pigment to flocculate on a recording medium, so the pigment is apt to remain on the surface of the recording medium. In particular, when printing is performed on plain paper by means of pigment ink that does not contain any resin or the like, a pigment particle itself remains on the surface of the recording medium. As a result, even after a sufficient time period from the printing, an image may be contaminated when the image is strongly scratched.

SUMMARY OF THE INVENTION

The investigation by the inventors of the present invention has revealed that each of the above techniques may not provide a sufficient (as compared to the volume of an ink droplet) area (so-called an area factor) by which the surface of a recording medium can be covered with a coloring material because pigment particles are flocculated on the recording medium. This finding means that each of the above techniques requires an increased amount of ink to be applied as compared to that of conventional pigment ink obtained by dispersing a pigment by means of a polymer dispersant or the like for obtaining the same image density, and each of the above techniques is susceptible to improvement in this respect. There exist a large number of methods of obtaining a large area factor even with an ink droplet having a small volume by improving the permeability of ink into a recording medium. However, when the permeability of ink is improved, the ink permeates into not only the surface of a recording medium but also the depth direction of the recording medium, so a sufficient image density may not be obtained.

The inventors of the present invention have pursued the advantages and disadvantages of the respective conventional inks and analyzed the characteristics of an image itself. As a result, they have revealed that, when a coloring material is present in ink in a high concentration, a large amount of excessive coloring material is present on the surface of a recording medium, or dots having visually different shapes are formed, and that a waste coloring material not involved in color development is present in the recording medium.

Further, the inventors of the present invention have confronted a problem in that the scraping of a printed portion and the contamination of a white portion caused by scratching an image portion having a secondary color formed by means of cyan ink such as green ink or blue ink with a finger or the like may be remarkable as compared to those of an image portion having a secondary color or the like formed by means of any other ink. Thus, they have acknowledged that further improvements are required.

The inventors of the present invention have found that an image superior to a conventional one can be formed by solving at least one of the above technical problems. The present invention solves at least one of the following problems, which were found by the inventors of the present invention.

(1) A problem in which, when a pigment present in ink in a dispersed state is forcedly flocculated at the surface of a recording medium, an area (so-called an area factor) by which the surface of the recording medium can be covered with a coloring material may not be sufficient as compared to the volume of an ink droplet, so the amount of ink to be applied necessary for obtaining the same image density increases.

(2) A problem in which, when the permeability of ink is improved, the ink permeates into not only the surface of a recording medium but also the depth direction of the recording medium, so a coloring material cannot be distributed in a high concentration near the surface of the recording medium, and hence a high image density cannot be achieved.

Therefore, an object of the present invention is to provide a cyan ink which: provides an image having a sufficiently large area factor even with a small amount of ink droplets, and having a high image density; and is excellent in storage stability.

Another object of the present invention is to provide a cyan ink capable of improving scratch resistance in the case where an image is formed by means of plurality of inks each of which provides an image having a sufficiently large area factor even with a small amount of ink droplets, and having a high image density.

Another object of the present invention is to provide an ink set which: provides an image having a sufficiently large area factor even with a small amount of ink droplets, and having a high image density; and is excellent in storage stability.

The above objects are achieved by the present invention. That is, according to one aspect of the present invention, there is provided a cyan ink applicable to an ink set having four kinds of aqueous inks composed of the cyan ink, magenta ink, yellow ink, and black ink each containing at least: water; a water-insoluble coloring material; and plurality of water-soluble organic solvents including a good medium or good mediums for the water-insoluble coloring material and a poor medium or poor mediums for the water-insoluble coloring material, the cyan ink being characterized in that: the ratio $B_1/A_1$ is 0.5 or more and 3.0 or less, when $A_1$ denotes the total content (mass %) of the good medium in the cyan ink and $B_1$ denotes the total content (mass %) of the poor medium in the cyan ink; a water-soluble organic solvent showing the maximum Ka value out of respective Ka values of the plurality of water-soluble organic solvents as each determined by the Bristow method is the poor medium; and A and B satisfies the following expression (I), when A denotes the total content (mass %) of the good medium in an arbitrary aqueous ink in the ink set except the cyan ink and B denotes the total content (mass %) of the poor medium in the arbitrary aqueous ink.

$$(B_1/A_1)/(B/A)<1 \qquad (I)$$

According to another aspect of the present invention, there is provided an ink set characterized by including four kinds of aqueous inks composed of the cyan ink having the above constitution, and magenta ink, yellow ink, and black ink each containing at least: water; a water-insoluble coloring material; and plurality of water-soluble organic solvents including a good medium or good mediums for the water-insoluble coloring material and a poor medium or poor mediums for the water-insoluble coloring material.

According to another aspect of the present invention, there is provided a cyan ink applicable to an image forming apparatus using the cyan ink, magenta ink, and yellow ink each containing at least: water; a water-insoluble coloring material; and plurality of water-soluble organic solvents including a good medium or good mediums for the water-insoluble coloring material and a poor medium or poor mediums for the water-insoluble coloring material, the cyan ink being characterized in that: the ratio $B_1/A_1$ is 0.5 or more and 3.0 or less, when $A_1$ denotes the total content (mass %) of the good medium in the cyan ink and $B_1$ denotes the total content (mass %) of the poor medium in the cyan ink; a water-soluble organic solvent showing the maximum Ka value out of respective Ka values of the plurality of water-soluble organic solvents as each determined by the Bristow method is the poor medium; and A and B satisfies the following expression (I), when A denotes the total content (mass %) of the good medium in an arbitrary aqueous ink applicable to the image forming apparatus except the cyan ink and B denotes the total content (mass %) of the poor medium in the arbitrary aqueous ink.

$$(B_1/A_1)/(B/A)<1 \qquad (I)$$

A technical gist of the present invention is conceptually summarized as follows. That is, the technical gist of the present invention is an aqueous cyan ink containing at least: water; a water-insoluble coloring material; and plurality of water-soluble organic solvents, the cyan ink being characterized in that: the plurality of water-soluble organic solvents include a good medium or good mediums for the water-insoluble coloring material and a poor medium or poor mediums for the water-insoluble coloring material; a water-soluble organic solvent showing the maximum Ka value out of respective Ka values of the plurality of water-soluble organic solvents as each determined by the Bristow method is the poor medium; and the poor medium permeates into a recording medium ahead of the good medium and the poor medium promotes flocculation of the water-insoluble coloring material in a liquid medium rich in the good medium on the surface side of the recording medium.

This constitution eliminates the need for incorporating a large amount of waste coloring material, which is present in a recording medium in a scattered state and is not involved in an image density, into ink unlike the conventional aqueous ink. In addition, an image can be brought into an ideal state. That is, there is no need to cause a large amount of coloring material to be present on a recording surface of a recording medium. At the same time, in the recording medium, the coloring material does not reach the surface opposite to the recording surface (recording can be performed on both surfaces). As a result, a uniform image having a high image density can be formed on the recording surface of the recording medium.

Another technical gist of the present invention is conceptually summarized as follows. That is, the other technical gist of the present invention is a cyan ink used for forming an image by means of plurality of inks, the cyan ink being characterized in that a ratio of a poor medium to a good medium in the cyan ink is lower than a ratio of a poor medium to a good medium in any ink except the cyan ink.

With this constitution, when an image is formed by means of plurality of inks, the amount of a water-insoluble coloring material in cyan ink present on a recording surface of a recording medium is smaller than those of water-insoluble coloring materials in other inks, so scratch resistance in an image having a multiple-color such as a secondary color can be improved.

According to the present invention, there can be provided a cyan ink which: provides an image having a sufficiently large area factor even with a small amount of ink droplets, and having a high image density; and is excellent in storage stability. According to another embodiment of the present invention, there can be provided a cyan ink capable of improving scratch resistance in the case where an image is formed by means of plurality of inks each of which provides an image having a sufficiently large area factor even with a small amount of ink droplets, and having a high image density. According to still another embodiment of the present invention, there can be provided an ink set which: provides an image having a sufficiently large area factor even with a small amount of ink droplets, and having a high image density; and is excellent in storage stability.

BRIEF DESCRIPTION OF THE DRAWINGS

FIGS. 8A, 8B, 8C and 8D are views each schematically explaining a state in which a droplet of an aqueous ink of the present invention impacts on the surface of a recording medium (plain paper), in which FIG. 8A shows a state before impact, FIG. 8B shows a state immediately after the impact, FIG. 8C shows a state during the formation of a dot, and FIG. 8D shows a state after the formation of the dot.

FIGS. 9A, 9B, 9C and 9D are views each schematically explaining a state in which a secondary color is formed by means of cyan ink (having a small B/A value) and magenta ink, in which FIG. 9A shows a state before impact, FIG. 9B shows a state immediately after the impact, FIG. 9C shows a state during the formation of a dot, and FIG. 9D shows a state after the formation of the dot.

FIGS. 10A, 10B, 10C and 10D are views each schematically explaining a state in which a secondary color is formed by means of cyan ink (having a large B/A value) and magenta ink, in which FIG. 10A shows a state before impact, FIG. 10B shows a state immediately after the impact, FIG. 10C shows a state during the formation of a dot, and FIG. 10D shows a state after the formation of the dot.

Figure 1:
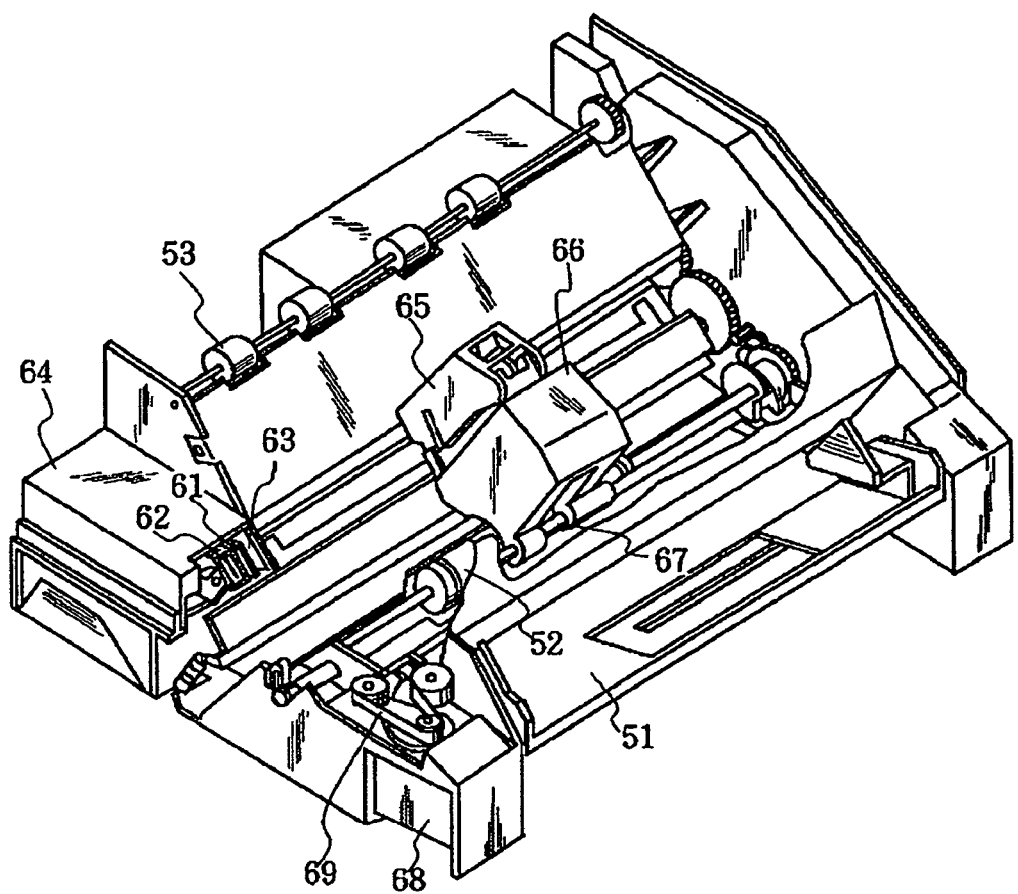
FIG. 1 is a schematic side sectional view showing an example of an ink-jet recording apparatus.

Reference numerals in the figures denote the following members.

| | |
|---|---|
| 51 | sheet-feeding portion |
| 52 | sheet-feeding roller |
| 53 | sheet-discharge roller |
| 61 | blade |
| 62 | cap |
| 63 | ink absorbent |
| 64 | ejection recovery portion |
| 65 | recording head |
| 66 | carriage |
| 67 | guide shaft |
| 68 | motor |
| 69 | belt |
| 1300 | recording medium |
| 1301 | ink droplet |
| 1302 | outer periphery of dot |
| 1303 | center portion of dot |
| 1304 | water-insoluble coloring material |
| 1305 | dot |
| 1306 | water-soluble organic solvent and water |
| 1307 | poor medium |
| 1308 | cyan ink |
| 1309 | water-soluble organic solvent in cyan ink |
| 1310 | water-insoluble coloring material in cyan ink |
| 1311 | magenta ink |
| 1312 | water-soluble organic solvent in magenta ink |
| 1313 | water-insoluble coloring material in magenta ink |
| 1314 | surface of recording medium |

DESCRIPTION OF THE PREFERRED EMBODIMENTS

Hereinafter, the present invention will be described in more detail by way of the best mode for carrying out the invention.

First, a poor medium and a good medium in the present invention will be described. Details about the definition of each of the poor and good mediums will be described later. A water-soluble organic solvent having good dispersion stability of a water-insoluble coloring material to be used as a coloring material is defined as a good medium, and a water-soluble organic solvent having poor dispersion stability of the water-insoluble coloring material is defined as a poor medium irrespective of a method of dispersing the water-insoluble coloring material.

The aqueous ink according to the present invention is further characterized in that: attention is paid to water-soluble organic solvents to be incorporated into the ink together with a water-insoluble coloring material; the water-soluble organic solvents each having a function of dissolving or dispersing the water-insoluble coloring material are classified into one showing behavior as the poor medium for the water-insoluble coloring material and one showing behavior as the good medium with respect thereto; and a ratio (B/A value) of the poor medium to the good medium in the ink is adjusted to fall within a specific range to design the ink. The ink according to the present invention is also characterized in that a water-soluble organic solvent showing the maximum Ka value (a measurement method will be described later) out of respective Ka values of the plurality of water-soluble organic solvents as each determined by the Bristow method is the poor medium in addition to the fact that the water-soluble organic solvents have the above specific constitutions.

As a result, an ink can be obtained, which: has very excellent dispersion stability of the water-insoluble coloring material in the ink; provides an image having a sufficiently large area factor even with a small amount of ink droplets, and having a high image density when printing is performed on a recording medium, especially plain paper; and is excellent in storage stability.

<Mechanism of Image Formation>

Here, an example of a mechanism of image formation in the present invention will be described. The aqueous ink according to the present invention is expected to provide a very excellent image density and very excellent printing quality by reason of the following when the ink is printed on a recording medium, especially plain paper.

That is, as shown in FIG. 8A, when an ink droplet 1301 according to the present invention is printed on a recording medium 1300 such as plain paper, the ratios of the good medium, the poor medium, and the water-insoluble coloring material to the water and the water-insoluble coloring material in ink start to change at the time when the ink impacts on the recording medium. In other words, as shown in FIGS. 8B and 8C, after the ink droplet 1301 has impacted on the surface of the recording medium 1300, as the ink is fixed to the recording medium, a poor medium 1307 having the maximum Ka value out of the water-soluble organic solvents in the ink scatters in a nearly complete circle form at a position nearer the surface of the recording medium that the position of a good medium having a lower Ka value together with the evaporation of water, so an ink dot is expected to be formed.

FIGS. 8B, 8C and 8D are schematic views showing the state of ink during the period commencing on the impact of the ink on the recording medium 1300 and ending on the fixation of the ink. Paying attention to the state of spreading of an ink dot in this case allows one to consider that the concentration of a poor medium is higher at an outer periphery 1302 of the dot at a portion of contact between the ink and the paper than at a center portion 1303 of the dot. As a result, the ink dot scatters in a nearly complete circle form near the surface of the recording medium, and the concentration of the poor medium 1307 with respect for the water-insoluble coloring material suddenly increases in the course of the scattering. The sudden increase involves the unstabilization of the dispersion of the water-insoluble coloring material to cause the flocculation or dispersion breakage of the water-insoluble coloring material. At this time, the ink dot scatters while taking an edge close to a complete circle form on the surface of the recording medium (see FIG. 8B), and a water-insoluble coloring material 1304 remains on the surface of the recording medium 1300 as if a bank of the water-insoluble coloring material were formed at the outer edge portion of the dot. Thus, the dot of the water-insoluble coloring material is expected to be formed in a complete circle form and fixed in this state on the surface of the recording medium (see FIG. 8C). At this time, the formation of the dot of the water-insoluble coloring material is completed, but the water-soluble organic solvents and water 1306 in the ink spread radially while scattering. In other words, even after the formation of the dot of the water-insoluble coloring material, the water-soluble organic solvents and the water 1306 continue to scatter near the surface of the recording medium. Subsequently, the evaporation or permeation of the water-soluble organic solvent at the good medium-rich center portion 1303 causes the water-insoluble coloring material to precipitate at the portion to form a dot 1305 (see FIG. 8D). An image formed through such a process as described above has a sufficiently large area factor even with a small amount of ink droplets, has a high image density, and effectively suppresses bleeding so as to be of high quality. In addition, effectively causing a water-insoluble coloring material in cyan ink applied to a recording medium to be present near the surface of the recording medium allows ink having a small coloring material content like the cyan ink according to the present invention to obtain a high image density.

Next, the inventors of the present invention have considered that an image excellent in color balance as compared to a conventional ink set can be obtained by applying the aqueous ink with such constitution as described above to any aqueous ink except cyan ink, that is, magenta ink, yellow ink, or black ink. In view of the above, the inventors of the present invention have changed a ratio of a poor medium to a good medium in each color to study various properties requested for an image formed on plain paper or the like. As a result, they have confirmed that the color balance of an image to be obtained can be improved by applying the aqueous ink with such constitution as described above to any aqueous ink except cyan ink, that is, magenta ink, yellow ink, or black ink.

In general, cyan ink has low brightness. Therefore, one feels that the scratch resistance of an image to be obtained by means of cyan ink is inferior to that of an image to be obtained by means of magenta ink or yellow ink even when the amounts of water-insoluble coloring materials in the cyan, magenta, or yellow ink present on the surface of a recording medium are the same. As a result, one may feel that the scratch resistance of the image to be obtained by means of cyan ink apparently deteriorates as compared to that of any other color. In view of the above, the inventors of the present invention have made further studies. As a result, they have confirmed that the scraping of an image and the contamination of a white portion which occur when an image printed with a secondary color such as green or blue is scratched can be reduced by reducing a ratio (B/A) of a poor medium to a good medium in cyan ink to be lower than that in any other color. As described above, scratch resistance which is felt to apparently deteriorate is defined as "bad scratch resistance" in the present invention. In addition, an apparent improvement of scratch resistance is defined as an "improvement of scratch resistance" in the present invention.

The inventors of the present inventions consider the reason by which such effect as described above can be obtained to be as follows. The mechanism with which such effect as described above can be obtained will be described with reference to FIGS. 9A, 9B, 9C, 9D, 10A, 10B, 10C and 10D. FIGS. 9A, 9B, 9C, 9D, 10A, 10B, 10C and 10D are views each schematically showing a course in which an ink droplet is applied to a recording medium such as plain paper to form an image by taking as an example a course in which an image having a secondary color (blue here) is formed by means of cyan ink and another ink (magenta ink here). FIGS. 9A, 9B, 9C and 9D show the case where the (B/A) value of cyan ink is smaller than that of another ink (magenta ink here), while FIGS. 10A, 10B, 10C and 10D show the case where the (B/A) value of cyan ink is larger than that of another ink (magenta ink here).

In FIGS. 9A, 9B, 9C, 9D, 10A, 10B, 10C and 10D, ink permeates into a recording medium basically with the same mechanism as that described above with reference to FIGS. 8A, 8B, 8C and 8D. As the (B/A) value of cyan ink is larger than that of another ink, the water-insoluble coloring material in the cyan ink is found to be more likely to precipitate nearer the surface layer portion of a recording medium. For example, as shown in FIGS. 9A, 9B, 9C and 9D, when the (B/A) value of cyan ink is smaller than that of another ink (magenta ink here), a higher percentage of the water-insoluble coloring material in the cyan ink is expected to be present at a position depressed in the depth direction of a recording medium as compared to the water-insoluble coloring material in the magenta ink. On the other hand, as shown in FIGS. 10A, 10B, 10C and 10D, when the (B/A) value of cyan ink is larger than that of another ink (magenta ink here), a higher percentage of the water-insoluble coloring material in the cyan ink is expected to be present near the surface of a recording medium as compared to the water-insoluble coloring material in the magenta ink. Furthermore, the water-insoluble coloring material in cyan ink can be allowed to be present at a position depressed in the depth direction of a recording medium as compared to the water-insoluble coloring material in another ink (magenta ink here) by taking into consideration a difference between the time at which the cyan ink impacts and the time at which the magenta ink impacts, a ratio of a poor medium to a good medium in each of the inks mixed on the recording medium, and the like. In particular, when the (B/A) value of cyan ink is lower than 1.0 and the (B/A) value of another ink (magenta ink here) is larger than 2.5, the scratch resistance of an image formed by applying the cyan ink to a recording medium after the application of the other ink (magenta ink here) can be much higher than that of an image formed by means of cyan ink and the other ink (magenta ink here) that do not satisfy the relational expression (I) of the present invention.

Furthermore, two kinds of images obtained by setting the (B/A) value of cyan ink and the (B/A) value of another ink (magenta ink here) to be as described above were scratched with a finger to observe the degree of scratch resistance. As a result, the scraping of an image and the contamination of a white portion occurring when the images were scratched were found to be more likely to be remarkable when a larger amount of the water-insoluble coloring material in the cyan ink was present near the surface of a recording medium as shown in FIGS. 10A, 10B, 10C and 10D.

The inventors of the present invention have studied the relationship between each property of a coloring material and scratch resistance. As a result, they have found that, when a larger amount of a water-insoluble coloring material having low brightness is present near the surface of a recording medium in an image having a secondary color or the like that tends to have an increased amount of ink applied, the scratch resistance of the image is more likely to be felt to apparently deteriorate. Although the above description has taken magenta ink as an example of ink to be used in combination with cyan ink to form a secondary color, the present invention is not limited thereto.

When an image having a multiple-color is formed by means of plurality of inks, the order in which the inks are applied to a recording medium is desirably such that ink having lower brightness is applied faster. With the order, most of a water-insoluble coloring material can be allowed to be present at a position depressed in the depth direction of the recording medium, so scratch resistance can be additionally improved.

<Method of Determining Good Medium and Poor Medium>

The good medium and the poor medium to be used in the present invention under such assumed mechanism as described above are determined on the basis of whether the dispersed state of a water-insoluble coloring material can be favorably maintained, that is, a relation between the water-insoluble coloring material and a dispersant therefor. Accordingly, in preparing the aqueous ink according to the present invention, the good medium and the poor medium are preferably selected on the basis of the observation of the degree of stability of the dispersed state of a water-insoluble coloring material to be used. The inventors of the present invention have found that the following determination method is effective as a result of various studies of the criteria for determination of the good medium and the poor medium providing the effects of the present invention in connection with the effects of the present invention.

First, a dispersion solution of water-insoluble coloring material is prepared which contains 50 mass % of each water-soluble organic solvent to be determined, 45 mass % of water, and 5 mass % of a water-insoluble coloring material to be used for the ink. Then, the prepared dispersion solution is stored at 60° C. for 48 hours. The water-soluble organic solvent is regarded as a poor medium when the average particle size of the water-insoluble coloring material in the liquid is larger than the average particle size of the water-insoluble coloring material in a water dispersion solution containing 5-mass % of the water-insoluble coloring material and 95 mass % of water. The water-soluble organic solvent is regarded as a good medium when the average particle size of the water-insoluble coloring material in the dispersion solution is equal to or smaller than the average particle size of the water-insoluble coloring material in a water dispersion solution containing 5-mass % of the water-insoluble coloring material and 95-mass % of water.

More specifically, determination as to whether a water-soluble organic solvent to be used is a good medium or a poor medium for a certain water-insoluble coloring material is made according to the following method. First, two kinds of dispersion solutions shown below are prepared: a dispersion solution A of a water-insoluble coloring material containing in a solvent containing the water-soluble organic solvent to be determined, and a water dispersion solution B of the same water-insoluble coloring material.

Dispersion solution A: A water-insoluble coloring material dispersion solution containing 50 mass % of a water-soluble organic solvent to be determined, 5 mass % of a water-insoluble coloring material (or 5 mass % in total of a water-insoluble coloring material and a substance contributing to the dispersion of the coloring material), and 45 mass % of water.

Water dispersion solution B: A water dispersion solution of a water-insoluble coloring material containing 5 mass % of the water-insoluble coloring material (or 5 mass % in total of the water-insoluble coloring material and a substance contributing to the dispersion of the coloring material), and 95 mass % of water.

The dispersion solution A is kept at 60° C. for 48 hours, and cooled to ordinary temperature. The average particle size of the water-insoluble coloring material in the dispersion solution A is measured with a fiber-optics particle analyzer (trade name: FPAR-1000; manufactured by Otsuka Electronics Co., Ltd.) or the like. Meanwhile, the average particle size of the water-insoluble coloring material in the water dispersion solution B that has not been stored under heat is measured with the fiber-optics particle analyzer in the same manner as that described above. The water-soluble organic solvent to be determined is determined to be a good medium or a poor medium in accordance with the following definition by means of the particle size (A) and particle size (B) of the water-insoluble coloring materials in the dispersion solution A and the water dispersion solution B, respectively.

Poor medium: When the particle size (A) is larger than the particle size (B) in the foregoing, the water-soluble organic solvent to be determined is defined as a poor medium.

Good medium: When the particle size (A) is equal to or smaller than the particle size (B), the water-soluble organic solvent to be determined is defined as a good medium.

The preparation of ink having the constitution of the present invention by means of the determined good and poor mediums as described above has been confirmed to provide such excellent effects as described above.

<Ka Value of Water-soluble Organic Solvent>

In the present invention, the mechanism of image formation described above can be expressed when a water-soluble organic solvent showing the maximum Ka value out of respective Ka values of plurality of water-soluble organic solvents as each determined by the Bristow method is a poor medium in addition to the fact that a water-soluble organic solvent is allowed to have such a specific constitution as described above.

Here, a Ka value determined by the Bristow method will be described. The value is used as an indication for the permeability of a liquid into a recording medium. Hereinafter, ink will be described as an example. That is, when the permeability of ink is represented by the amount V of the ink per 1 m², the amount of permeation V of the ink into a recording medium (mL/m²=µm) after a predetermined time t from the ejection of an ink droplet is represented by Bristow's equation (Equation (1)) shown below.

$$V=Vr+Ka(t-t_w)^{1/2} \qquad \text{Eq. (1)}$$

Immediately after ink has been applied to a recording medium, most of the ink is absorbed by irregularities on the surface of the recording medium (surface roughness portions on the surface of the recording medium), and nearly no ink permeates into the recording medium (depth direction). The time required for the absorption is a contact time ($t_w$), and the amount of the ink absorbed by the surface roughness portion of the recording medium during the contact time is denoted by $V_r$. Then, after the ink has been applied to the recording medium, an amount of the ink in proportion to the square root of the time exceeding the contact time, that is, ($t-t_w$), to thereby increase the amount of permeation. Ka represents a proportionality factor of the increase, and shows a value in accordance with the rate of permeation. The Ka value can be measured by means of, for example, a dynamic permeability tester for a liquid according to the Bristow method (for example, trade name: dynamic permeability tester S; manufactured by Toyo Seiki Seisaku-Sho, Ltd.).

The Ka value according to the Bristow method in the present invention is a value measured by means of plain paper (for example, PB paper (manufactured by CANON Inc.) to be used for a copying machine utilizing an electrophotographic method, a page printer (laser beam printer), or a printer utilizing an ink-jet recording method, or PPC paper for a copying machine utilizing an electrophotographic method) as a recording medium. The assumed measurement environment is an ordinary office environment such as an environment having a temperature of 20° C. to 25° C. and a humidity of 40% to 60%.

<Aqueous Ink>

A water-soluble organic solvent in the ink components of the cyan ink according to the present invention must have such a constitution as described above in connection with the water-insoluble coloring material to be used. The other constitution may be similar constitution as that of the conventional aqueous ink. The respective components constituting the aqueous ink of the present invention will be described below.

The magenta ink, the yellow ink, and the black ink are not particularly limited as long as each of them contains water, a water-insoluble coloring material, and plurality of water-soluble organic solvents including a good medium or good mediums for the water-insoluble coloring material and a poor medium or poor mediums for the water-insoluble coloring material. The magenta ink, the yellow ink, and the black ink preferably have similar constitution as that of the cyan ink except for the items described below for the respective hues.

<Aqueous Medium>

An aqueous medium constituting the aqueous ink according to the present invention will be described. The aqueous medium is a mixed solvent of water and a water-soluble organic solvent. In the cyan ink of the present invention, the water-soluble organic solvents are determined to be good medium and poor mediums for the water-insoluble coloring material according to the method described above. Then, on the basis of the result of determination, water-soluble organic solvents must be selected and appropriately blended to prepare ink in such a manner that: at least the good medium and poor medium are simultaneously present in the aqueous ink, and the content of each water-soluble organic solvent is in the range specified in the present invention; and a water-soluble organic solvent showing the maximum Ka value out of respective Ka values of the plurality of water-soluble organic solvents each determined by the Bristow method is the poor medium.

Specific examples of the water-soluble organic solvents include: alkyl alcohols each having 1 to 4 carbon atoms such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones or keto alcohols such as acetone and diacetone alcohol; ethers such as tetrahydrofuran and dioxane; polyalkylene glycols such as polyethylene glycol and polypropylene glycol; alkylene glycols in each of which an alkylene group has 2 to 6 carbon atoms such as ethylene glycol, propylene glycol, butylene glycol, triethylene glycol, 1,2,6-hexane triol, thio diglycol, hexylene glycol, and diethylene glycol; lower alkyl ether acetates such as polyethylene glycol monomethyl ether acetate; glycerin; lower alkyl ethers of polyhydric alcohols such as ethylene glycol monomethyl (or ethyl) ether, diethylene glycol methyl (or ethyl) ether, and triethylene glycol monomethyl (or ethyl) ether; N-methyl-2-pyrrolidone; 2-pyrrolidone; and 1,3-dimethyl-2-imidazolidinone. In addition, deionized water is desirably used as water.

In the cyan ink of the present invention, when the water-soluble organic solvents are selected in such a manner that: at least the good medium and poor medium are simultaneously present; and a water-soluble organic solvent showing the maximum Ka value is the poor medium, and the ratio B/A is adjusted to be 0.5 or more and 3.0 or less, when A denotes the total content (mass %) of the good medium based on the total mass of the aqueous ink and B denotes the total content (mass %) of the poor medium based on the total mass of the aqueous ink. The cyan ink of the present invention has the ratio B/A of 0.5 or more and 1.0 or less, or more preferably 0.6 or more and 1.0 or less.

Here, the relationship between the ratio B/A of the poor medium to the good medium in the cyan ink and the ratio B/A of the poor medium to the good medium in the aqueous ink of any other color in the ink set will by described. When the ratio of the poor medium to the good medium in the cyan ink of the present invention is denoted by $B_1/A_1$, the ratio $B_1/A_1$ and the ratio B/A in an arbitrary aqueous ink in the ink set except the cyan ink satisfy the following expression (1). The following expression (I) means that the cyan ink of the present invention has the minimum B/A value out of the aqueous inks in the ink set.

$$(B_1/A_1)/(B/A)<1 \qquad (I)$$

According to a preferred embodiment of the present invention, the following expression (I') is preferably satisfied.

$$(B_1/A_1)/(B/A)<0.6$$

According to the detailed investigation by the inventors of the present invention, when the content of a good medium in aqueous ink is large, the aqueous ink is excellent in storage stability, but a high image density is hardly obtained when plain paper is used as a recording medium. In addition, when the content of the good medium in the aqueous ink is small, a high image density can be obtained, but the storage stability of the aqueous ink may be insufficient.

In contrast, controlling a ratio of a poor medium to a good medium out of the water-soluble organic solvents in aqueous ink as described above allows one to achieve compatibility between the storage stability of the aqueous ink and a high image density. Furthermore, as described above, an effect that cannot be conventionally obtained, that is the realization of an image having a sufficiently large area factor even with a small amount of ink droplets, and having a high image density can be achieved by controlling a Ka value determined by the Bristow method, which is an indication for the permeability into a recording medium, in determining the respective water-soluble organic solvents to be incorporated into ink.

In each of the magenta ink, the yellow ink, and the black ink in the ink set of the present invention except the cyan ink, water-soluble organic solvents are preferably selected in such a manner that: at least good medium and poor medium are simultaneously present; and a water-soluble organic solvent showing the maximum Ka value is the poor medium. The ratio B/A is preferably 0.5 or more and 3.0 or less, more preferably 0.5 or more and 1.0 or less, or particularly preferably 0.6 or more and 1.0 or less, when A denotes the total content (mass %) of the good medium based on the total mass of each aqueous ink and B denotes the total content (mass %) of the poor medium based on the total mass of each aqueous ink.

Here, the relationship between the ratio B/A of the poor medium to the good medium in each of the magenta ink, the yellow ink, and the black ink, and the ratio B/A of the poor medium to the good medium in aqueous ink of any other color in the ink set will be described. When the ratio B/A in the magenta ink is denoted by $B_2/A_2$, the ratio B/A in the yellow ink is denoted by $B_3/A_3$, and the ratio B/A in the black ink is denoted by $B_4/A_4$, the following expressions are preferably satisfied in the aqueous inks of the respective colors.

Magenta Ink $$0.6 \leq (B_2/A_2)/(B/A) < 1.8 \quad \text{(II)}$$

Yellow Ink $$0.6 \leq (B_3/A_3)/(B/A) < 1.8 \quad \text{(III)}$$

Black Ink $$0.6 \leq (B_4/A_4)/(B/A) < 1.8 \quad \text{(VI)}$$

The ratio B/A in each of the expressions (II) to (IV) refers to a ratio B/A of a poor medium to a good medium in an arbitrary aqueous ink in an ink set except the aqueous ink concerned. That is, the above expressions are preferably satisfied for all aqueous inks in the ink set except the aqueous ink concerned. In each of the expressions (II) to (IV), the value on the most left side is particularly preferably 0.8 instead of 0.6. In each of the expressions (II) to (IV), the value on the most right side is particularly preferably 1.3 instead of 1.8.

According to the investigation by the inventors of the present invention, a Ka value in aqueous ink is adjusted to be preferably less than 1.5, or more preferably 0.2 or more and less than 1.5 for additionally improving the quality of a recorded image formed. That is, adjusting a Ka value in aqueous ink allows solid-liquid separation to occur at an early stage of the course of the permeation of the aqueous ink into a recording medium, so a high-quality image with extremely little bleeding can be formed.

The content of the water-soluble organic solvents in the aqueous ink according to the present invention is not particularly limited, but is in the range of preferably 3 mass % to 50 mass %, or more preferably 10 mass % to 35 mass % (both inclusive) based on the total mass of the ink. In addition, the water content (mass %) in the aqueous ink is in the range of preferably 50 mass % to 95 mass %, or more preferably 60 mass % to 90 mass % based on the total mass of the ink.

The total content (mass %) of the poor medium in the aqueous ink according to the present invention is more preferably 4 mass % or more based on the total mass of the ink for achieving compatibility between a high image density and the storage stability of the ink. The total content (mass %) of the poor medium is preferably 37.5 mass % or less, or more preferably 5 mass % or more and 20 mass % or less based on the total mass of the ink.

<Water-insoluble Coloring Material>

The water-insoluble coloring material constituting the aqueous ink according to the present invention will be described. The water-insoluble coloring material constituting the aqueous ink of the present invention may be any one irrespective of how it is dispersed. Of those, a pigment is particularly preferably used. To be specific, for example, the pigment may be: a pigment of so-called resin-dispersed type using a dispersant or a surfactant (resin-dispersed pigment); a pigment of surfactant-dispersed type; a microcapsule-type pigment with its dispersibility enhanced to enable the dispersion of the pigment without the use of a dispersant or the like; a pigment of so-called self-dispersion type having a hydrophilic group introduced to the surface of a pigment particle (self-dispersion pigment); or a denatured pigment having an organic group containing a polymer chemically bonded to the surface of a pigment particle (polymer-bonded self-dispersion pigment). Of course, those pigments to be dispersed in different ways may be used in combination.

The water-insoluble coloring material of the present invention such as the resin-dispersed pigment, the self-dispersion pigment, or the polymer-bonded self-dispersion pigment described above is dispersed in an aqueous medium. That is, it is needless to say that the good medium and poor medium for the water-insoluble coloring material of the present invention refer to good medium and poor medium for the resin-dispersed pigment, the self-dispersion pigment, the polymer-bonded self-dispersion pigment, or the like. Hereinafter, the water-insoluble coloring material that can be used in the present invention will be described.

The content (mass %) of the water-insoluble coloring material in the aqueous ink of the present invention is preferably 0.1 mass % or more and 15.0 mass % or less, or more preferably 1.0 mass % or more and 10.0 mass % or less based on the total mass of the ink.

(Pigment)

The pigment that can be used in the aqueous ink according to the present invention is not particularly limited, and any one of those described below can be used.

Carbon black is suitably used for black ink. For example, any one of furnace black, lamp black, acetylene black, and channel black can be used as carbon black. Specific examples of carbon black include commercially available products such as: Raven 7000, Raven 5750, Raven 5250, Raven 5000 ULTRA, Raven 3500, Raven 2000, Raven 1500, Raven 1250, Raven 1200, Raven 1190 ULTRA-II, Raven 1170, and Raven 1255 (manufactured by Columbian Chemicals Co.); Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400, Monarch 2000, and Vulcan XC-72R (manufactured by Cabot Corporation); Color Black FW1, Color Black FW2, Color Black FW2V, Color Black FW18, Color Black FW200, Color Black S150, Color Black S160, Color Black S170, Printex 35, Printex U, Printex V, Printex 140U, Printex 140V, Special Black 6, Special Black 5, Special Black 4A, and Special Black 4 (manufactured by Degussa Corporation); and No. 25, No. 33, No. 40, No. 47, No. 52, No. 900, No. 2300, MCF-88, MA600, MA7, MA8, and MA100 (manufactured by Mitsubishi Chemical Corporation). Carbon black newly prepared for the present invention may also be used. However, the present invention is not limited to them. Any conventionally known carbon black may be used. Magnetic fine particles made of magnetite, ferrite, or the like, titanium black, or the like may be used as the black pigment instead of carbon black.

Examples of pigment particles to be used except the black ink include various organic pigment particles. Specific examples of the organic pigments include: insoluble azo pigments such as toluidine red, toluidine maroon, Hansa yellow, benzidine yellow, and pyrazolone red; soluble azo pigments such as lithol red, helio bordeaux, pigment scarlet, and permanent red 2B; derivatives of vat dyes such as alizarin, indanthrone, and thioindigo maroon; phthalocyanine-based pigments such as phthalocyanine blue and phthalocyanine green; quinacridone-based pigments such as quinacridone red and quinacridone magenta; perylene-based pigments such as perylene red and perylene scarlet; isoindolinone-based pigments such as isoindolinone yellow and isoindolinone orange; imidazolone-based pigments such as benzimidazolone yellow, benzimidazolone orange, and benzimidazolone red; pyranthrone-based pigments such as pyranthrone red and pyranthrone orange; indigo-based pigments; condensed azo-based pigments; thioindigo-based pigments; diketopyrrolopyrrole-based pigments; flavanthrone yellow; acylamide yellow; quinophthalone yellow; nickel azo yellow; copper azo methine yellow; perinone orange; anthrone orange; dianthraquinonyl red; and dioxazine violet. Of course, the present invention is not limited to them, and any other organic pigment may be used.

Further, examples of the organic pigment represented by a color index (C.I.) number include the following.

C.I. Pigment Yellow 12, 13, 14, 17, 20, 24, 74, 83, 86, 93, 97, 109, 110, 117, 120, 125, 128, 137, 138, 147, 148, 150, 151, 153, 154, 166, 168, 180, and 185

C.I. Pigment Orange 16, 36, 43, 51, 55, 59, 61, and 71

C.I. Pigment Red 9, 48, 49, 52, 53, 57, 97, 122, 123, 149, 168, 175, 176, 177, 180, 192, 215, 216, 217, 220, 223, 224, 226, 227, 228, 238, 240, 254, 255, and 272

C.I. Pigment Violet 19, 23, 29, 30, 37, 40, and 50

C.I. Pigment Blue 15, 15:1, 15:3, 15:4, 15:6, 22, 60, and 64

C.I. Pigment Green 7 and 36

C.I. Pigment Brown 23, 25, and 26

(Resin-dispersion Pigment)

As described above, a resin-dispersion pigment using a dispersant can be used as the water-insoluble coloring material that can be used in the aqueous ink according to the present invention. In this case, a compound such as a surfactant or a resin dispersant for dispersing such a hydrophobic pigment as described above is required.

An anionic surfactant or a nonionic surfactant is a preferable surfactant. Specific examples of the anionic surfactant include a fatty acid salt, an alkyl sulfate, an alkyl benzenesulfonate, an alkyl naphthalenesulfonate, a dialkyl sulfosuccinate, an alkyl phosphate, a formalin condensate of naphthalenesulfonic acid, a polyoxyethylene alkyl sulfate, and substituted derivatives thereof. Specific examples of the nonionic surfactant include a polyoxyethylene alkyl ether, a polyoxyethylene alkyl phenyl ether, a polyoxyethylene fatty acid ester, a sorbitan fatty acid ester, a polyoxyethylene sorbitan fatty acid ester, a polyoxyethylene alkylamine, a glycerin fatty acid ester, an oxyethylene oxypropylene block polymer, and substituted derivatives thereof.

Specific examples of the resin dispersant include (1) block copolymers, random copolymers, and graft copolymers each composed of at least two monomers (at least one of which is a hydrophilic monomer) selected from: styrene and a derivative thereof; vinyl naphthalene and a derivative thereof; a fatty acid alcohol ester of $\alpha,\beta$-ethylenically unsaturated carboxylic acid; acrylic acid and a derivative thereof; maleic acid and a derivative thereof; itaconic acid and a derivative thereof; fumaric acid and a derivative thereof; and vinyl acetate, vinyl alcohol, vinyl pyrrolidone, and acrylamide, and derivatives thereof, and (2) salts of the copolymers. Furthermore, for example, a block copolymer and a random copolymer may be used in combination.

(Microcapsule-type Pigment)

As described above, a microcapsule-type pigment obtained by coating a water-insoluble coloring material with an organic polymer or the like to prepare a microcapsule can be used as the water-insoluble coloring material that can be used in the aqueous ink according to the present invention. Examples of a method of coating a water-insoluble coloring material with an organic polymer or the like to prepare a microcapsule include a chemical production method, a physical production method, a physicochemical method, and a mechanical production method. Specific examples thereof include an interfacial polymerization method, an in-situ polymerization method, a submerged cure coating method, a coacervation (phase separation) method, a submerged drying method, a melting dispersion cooling method, an aerial suspension coating method, a spray drying method, an acid precipitation method, and a phase inversion emulsification method.

Specific examples of the organic polymer or the like to be used as a material constituting the wall membrane substance of a microcapsule include: polyamide; polyurethane; polyester; polyurea; an epoxy resin; polycarbonate; a urea resin; a melamine resin; a phenol resin; polysaccharides; gelatin; gum arabic; dextran; casein; protein; natural rubber; carboxypolymethylene; polyvinyl alcohol; polyvinyl pyrrolidone; polyvinyl acetate; polyvinyl chloride; polyvinylidene chloride; cellulose; ethylcellulose; methylcellulose; nitrocellulose; hydroxyethylcellulose; cellulose acetate; polyethylene; polystyrene; a polymer or copolymer of (meth)acrylic acid; a polymer or copolymer of (meth)acrylate; a (meth) acrylic acid-(meth)acrylate copolymer; a styrene-(meth) acrylic acid copolymer; a styrene-maleic acid copolymer; soda alginate; a fatty acid; paraffin; beeswax; water wax; hardened beef tallow; carnauba wax; and albumin. Of those, an organic polymer or the like having an anionic group such as a carboxylic group or a sulfonic group is preferable. Specific examples of a nonionic organic polymer include: polyvinyl alcohol, polyethylene glycol monomethacrylate, polypropylene glycol monomethacrylate, and methoxypolyethylene glycol monomethacrylate, and (co)polymers of them; and a cation ring-opening polymer of 2-oxazoline. A completely saponified product of polyvinyl alcohol is particularly preferable because it has low water solubility and is easily soluble in hot water but is hardly soluble in cold water.

When a phase inversion method or an acid precipitation method is used for preparing a microcapsule, an anionic organic polymer or the like is used as an organic polymer or the like constituting the wall membrane substance of the microcapsule.

The phase inversion method involves: turning a composite or complex of an anionic organic polymer or the like having self dispersibility or solubility in water and a coloring material such as a self-dispersion organic pigment or self-dispersion carbon black, or a mixture of a coloring material such as a self-dispersion organic pigment or self-dispersion carbon black, a curing agent, and an anionic organic polymer or the like, into an organic solvent phase; adding water to the organic solvent phase (or adding the organic solvent phase to water); and turning the mixture into a microcapsule while subjecting the mixture to self dispersion (phase inversion emulsification). The phase inversion method may involve mixing the organic solvent phase with a water-soluble organic solvent or an additive to be used for ink. In particular, an aqueous medium of ink is preferably mixed because a dispersion solution for the ink can be directly produced.

The acid precipitation method includes the steps of: neutralizing in whole or in part the anionic groups of an organic polymer or the like having the anionic groups with a basic compound; kneading the resultant with a coloring material such as a self-dispersion organic pigment or self-dispersion carbon black in an aqueous medium; adjusting the pH with the acid compound to be a neutral or acidic one to precipitate an anionic group-containing organic polymer or the like; causing the organic polymer or the like to adhere to a pigment to produce a water-containing cake; and neutralizing in whole or in part the anionic groups of the water-containing cake with a basic compound to prepare a microcapsule. The acid precipitation method allows a fine anionic microencapsulated pigment containing a large amount of pigment to be produced.

Specific examples of such an organic solvent as described above to be used for microencapsulation include: alkyl alcohols such as methanol, ethanol, propanol, and butanol;

aromatic hydrocarbons such as benzol, toluol, and xylol; esters such as methyl acetate, ethyl acetate, and butyl acetate; chlorinated hydrocarbons such as chloroform and ethylene dichloride; ketones such as acetone and methyl isobutyl ketone; ethers such as tetrahydrofuran and dioxane; and cellosolves such as methyl cellosolve and butyl cellosolve.

The microcapsules prepared according to the above method may be separated from organic solvents for them through centrifugation, filtration, or the like and stirred with water and a required solvent for re-dispersion to prepare a target microcapsule-type pigment. The average particle size of the microcapsule-type pigment to be obtained according to such a method as described above is preferably 50 nm to 180 nm.

(Self-dispersion Pigment)

As described above, a self-dispersion pigment with its dispersibility enhanced to enable the dispersion of the pigment without the use of a dispersant or the like may be used as the water-insoluble coloring material that can be used in the aqueous ink according to the present invention. The self-dispersion pigment preferably has a hydrophilic group chemically bonded to the surface of a pigment particle either directly or via any other atomic group. For example, a self-dispersion pigment having a hydrophilic group selected from the group consisting of —COOM1, —SO$_3$M1, and —PO$_3$H(M1)$_2$ (M1 in the formulae represents a hydrogen atom, an alkali metal, ammonium, or an organic ammonium) introduced to the surface of a pigment particle can be suitably used. The other atomic group is preferably an alkylene group having 1 to 12 carbon atoms, a substituted or unsubstituted phenylene group, or a substituted or unsubstituted naphthylene group. A self-dispersion pigment with its surface oxidized can also be suitably used, which is obtained by means of, for example, a method involving oxidizing carbon black with soda hypochlorite, a method involving oxidizing carbon black through a submerged ozone treatment, or a method involving performing an ozone treatment and subjecting carbon black to wet oxidation to denature the surface of carbon black.

(Polymer-bonded Self-dispersion Pigment)

As described above, a polymer-bonded self-dispersion pigment with its dispersibility enhanced to enable the dispersion of the pigment without the use of a dispersant or the like may be used as the water-insoluble coloring material that can be used in the aqueous ink according to the present invention. The polymer-bonded self-dispersion pigment preferably contains a reactant of: a functional group chemically bonded to the surface of the pigment either directly or via any other atomic group; and a copolymer of an ionic monomer and a hydrophobic monomer. This is because a copolymerization ratio between the ionic monomer and the hydrophobic monomer as materials for forming a copolymer to be used for denaturing the surface of the pigment can be appropriately changed, and the change allows the hydrophilicity of the denatured pigment to be appropriately adjusted. Various properties can also be imparted to the surface of the pigment because the kinds of ionic and hydrophobic monomers to be used and the combination of the monomers can be appropriately changed.

<Functional Group>

A functional group of the polymer-bonded self-dispersion pigment is chemically bonded to the surface of the pigment either directly or via any other atomic group. The functional group intends to constitute an organic group through a reaction with a copolymer to be described later, and the kind of the functional group is selected in connection with a functional group carried on the copolymer. The reaction between the functional group and the copolymer is preferably a reaction producing a bond that does not cause hydrolysis or the like such as an amide bond in consideration of the fact that the pigment is dispersed into an aqueous medium. To this end, an amino group is used as the functional group and the copolymer is allowed to carry a carboxyl group. Thus, the copolymer can be introduced to the surface of a pigment particle via an amide bond. Alternatively, a carboxyl group is used as the functional group and the copolymer is allowed to carry an amino group. Thus, the copolymer can be introduced to the surface of a pigment particle via an amide bond as described above.

The functional group may be chemically bonded to the surface of the pigment either directly or via any other atomic group. However, when a copolymer having a relatively large molecular weight is to be introduced to the surface of the pigment, the functional group is preferably introduced to the surface of the pigment via any other atomic group in order to prevent steric hindrance between copolymers. The other atomic group is not particularly limited as long as it is a polyvalent element or an organic group. However, by reason of the foregoing, for example, a divalent organic residue is preferably used from the viewpoint of control of a distance between the functional group and the surface of the pigment. Specific examples of the divalent organic residue include an alkylene group and an arylene (phenylene) group.

More specifically, in, for example, each example to be described later, a pigment is allowed to react with aminophenyl(2-sulfoethyl)sulfone to introduce an aminophenyl(2-sulfoethyl)sulfone group to the surface of the pigment, and then an amino group of pentaethylene hexamine and the aminophenyl(2-sulfoethyl)sulfone group are allowed to react with each other to introduce an amino group as a functional group. In this case, the amino group is chemically bonded to the surface of the pigment via an atomic group containing a phenyl(2-sulfoethyl) group. Of course, the present invention is not limited thereto.

<Copolymer>

A copolymer of an ionic monomer and a hydrophobic monomer is preferably, for example, an anionic copolymer having anionic property or a cationic copolymer having cationic property.

Examples of the anionic copolymer include a copolymer of a hydrophobic monomer and an anionic monomer, and a salt of the copolymer.

Specific examples of the hydrophobic monomer include: styrene; vinyl naphthalene; alkyl methacrylates such as methyl methacrylate; alkyl acrylates such as phenyl methacrylate, benzyl methacrylate, 2-ethoxyethyl methacrylate, methacrylonitrile, 2-trimethylsiloxyethyl methacrylate, glycidyl methacrylate, p-tolyl methacrylate, sorbil methacrylate, and methyl acrylate; phenyl acrylate; benzyl acrylate; acrylonitrile; 2-trimethylsiloxyethyl acrylate; glycidyl acrylate; p-tolyl acrylate; and sorbil acrylate. Specific examples of the anionic monomer include acrylic acid, methacrylic acid, and maleic acid. Of course, the present invention is not limited thereto.

An anionic copolymer of an anionic monomer and a hydrophobic monomer is composed of at least two monomers including any one selected from the hydrophobic monomers listed above and at least one selected from the anionic monomers listed above. Examples of the anionic copolymer include a block copolymer, a random copolymer, a graft copolymer, and salts of the copolymers.

Such anionic copolymer preferably has an acid value in the range of 100 to 500, and the acid values of the copolymer are preferably in the range of the average acid value ±20% (both inclusive). When an acid value is higher than the above range, the hydrophilicity of the surface of the pigment becomes excessively high, so water and a solvent in the ink after printing may remain on the surface of the pigment to retard the expression of scratch resistance after the printing on a recording medium. When an acid value is lower than the above range, the hydrophilicity of the surface of the pigment becomes excessively low, so the pigment may be hardly dispersed into the ink in a stable manner.

Examples of the salt of the anionic copolymer include: alkali metal (such as sodium, lithium, or potassium) salts; ammonium salts; alkylamine salts; and alkanolamine salts. Each of them may be used alone, or two or more of them may be appropriately used in combination.

Examples of the cationic copolymer include a copolymer of a hydrophobic monomer and a cationic monomer, and a salt of the copolymer.

Any one of the monomers listed above can be used as the hydrophobic monomer. Specific examples of the cationic monomer include allylamine, dimethylaminoethyl methacrylate, diethylaminoethyl methacrylate, tert-butylaminoethyl methacrylate, dimethylaminoethyl acrylate, diethylaminoethyl acrylate, dimethylaminopropyl methacrylamide, N-vinylcarbazole, methacrylamide, acrylamide, and dimethylacrylamide. Of course, the present invention is not limited thereto.

A cationic copolymer of a cationic monomer and a hydrophobic monomer is composed of at least two monomers including any one selected from the hydrophobic monomers listed above and at least one selected from the cationic monomers listed above. Examples of the cationic copolymer include a block copolymer, a random copolymer, a graft copolymer, and salts of the copolymers.

Such cationic copolymer preferably has an amine value in the range of 100 to 500, and the amine values of the copolymer are preferably in the range of the average amine value ±20% (both inclusive). The amine value is determined by neutralizing 1 g of a sample and representing the amount required for the neutralization in KOHmg in correspondence with an acid value.

Examples of the salt of the cationic copolymer include acetic acid, hydrochloric acid, and nitric acid. Each of them may be used alone, or two or more of them may be appropriately used in combination.

The anionic or cationic copolymer described above has a weight average molecular weight (Mw) in the range of preferably 1,000 to 20,000, or more preferably 3,000 to 20,000. The polydispersity index (Mw/Mn) (where Mw represents a weight average molecular weight and Mn represents a number average molecular weight) of a cationic copolymer segment is preferably 3 or less. The content of the mass of such anionic or cationic copolymer is preferably 5% or more and 40% or less based on the mass of the pigment particles with their surfaces denatured with the copolymer. In addition, the molecular weight distribution of a copolymer is preferably uniform because, when the copolymer has a large polydispersity index, the molecular weight distribution of the copolymer broadens, and hence the above-described properties based on the molecular weight of the copolymer are hardly expressed.

Next, a method involving chemically bonding an organic group to the surface of a pigment particle to denature a pigment will be described by taking carbon black as an example. The method to be used at this time may be any one of the generally used methods without any particular limitation as long as the method involves: introducing a functional group to the surface of a pigment particle; and bonding a copolymer composed of an ionic monomer and a hydrophobic monomer to the functional group to chemically bond the copolymer to the surface of the pigment particle.

Specifically, for example, each of the following methods can be used as such method. A method involving: introducing polyethyleneimine or the like to the surface of a pigment particle such as carbon black; and bonding, to the terminal functional group, a copolymer composed of an ionic monomer and a hydrophobic monomer, the copolymer having an amino group, through a diazonium reaction, and a method involving bonding, to the surface of a pigment particle such as carbon black, a copolymer having an amino group and a carboxyl group in a molecule through a diazonium reaction can be used. The most typical example out of the other methods is disclosed in WO 01/51566 A1.

For example, when an anionic copolymer is chemically bonded to the surface of a carbon black particle in the above method, the following three steps must be performed.

First step; A step of adding an aminophenyl(2-sulfoethyl) sulfone group (APSES) to carbon black through a diazonium reaction.

Second step; A step of adding polyethyleneimine or pentaethylene hexamine (PEHA) to carbon black treated with APSES.

Third step; A step of bonding a copolymer of a hydrophobic monomer and an ionic monomer having a carboxyl group.

In the second step, the phenyl(2-sulfoethyl)sulfone group chemically bonded to the carbon black surface in the first step and an amino group of PEHA are allowed to react with each other to introduce an amino group as a functional group chemically bonded to the carbon black surface. In the third step, for example, part of the carboxyl groups of the ionic monomer portion of the copolymer are allowed to react with amino groups to form amide bonds, whereby the copolymer can be introduced to the carbon black surface via an atomic group containing a phenyl(2-sulfoethyl) group as a residue of APSES and a residue of PEHA.

For example, when a cationic copolymer is chemically bonded to the surface of a carbon black particle in the above method, the following two steps must be performed.

First step; A step of adding an aminophenyl(2-sulfoethyl) sulfone group (APSES) to carbon black through a diazonium reaction.

Second step; A step of bonding a copolymer of a hydrophobic monomer and a cationic monomer.

In the first step, a sulfone group is introduced as a functional group chemically bonded to the carbon black surface. In the second step, for example, part of the amino groups of the ionic monomer portion of the copolymer are allowed to react with sulfone groups (nucleophilic substitution) to introduce the copolymer to the carbon black surface via an atomic group containing a phenyl(2-sulfoethyl) group as a residue of APSES.

<Other Components>

For maintaining moisture retention, the aqueous ink according to the present invention may use a moisture-retaining solid content such as urea, a urea derivative, trimethylolpropane, or trimethylolethane as an ink component as well as the above components. The content of the moisture-retaining solid content such as urea, a urea derivative, or trimethylolpropane in the aqueous ink is generally in the range of 0.1 mass % to 20.0 mass %, or more preferably 3.0 mass % to 10.0 mass % based on the total mass of the ink.

The aqueous ink according to the present invention may contain any one of various additives such as a surfactant, a pH adjustor, a rust inhibitor, an antiseptic, a mildewproofing agent, an antioxidant, an antireducing agent, an evaporation accelerator, and a chelating agent as required as well as the above components.

The aqueous ink according to the present invention is preferably added with a nonionic surfactant for adjusting a surface tension and for improving ejection property. Specific examples of the nonionic surfactant include the compounds each having a structure represented by any one of the following structural formulae (1) to (4).

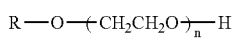

Structural formula (1)

(In the structural formula (1), R represents an alkyl group and n represents an integer.)

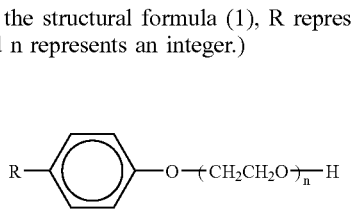

Structural formula (2)

(In the structural formula (2), R represents an alkyl group and n represents an integer.)

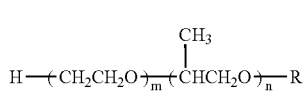

Structural formula (3)

(In the structural formula (3), R represents a hydrogen atom or an alkyl group, and m and n each represent an integer.)

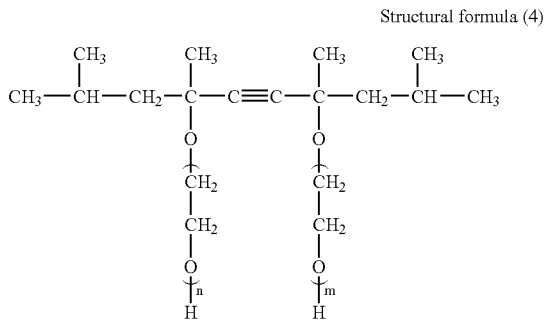

Structural formula (4)

(In the structural formula (4), m and n each represent an integer.)

In the structural formula (1), R preferably represents a linear or branched alkyl group having 8 to 21 carbon atoms, and n preferably represents an integer of 5 to 40. A mixture of two or more kinds of compounds different from each other in R and/or n may be used.

In the structural formula (2), R preferably represents a linear or branched alkyl group having 8 to 21 carbon atoms, and n preferably represents an integer of 5 to 40. A mixture of two or more kinds of compounds different from each other in R and/or n may be used.

In the structural formula (3), m preferably represents an integer of 1 to 10, and n preferably represents an integer of 1 to 10. It should be noted that m represents the number of ethylene oxide units and n represents the number of propylene oxide units. The compound represented by the structural formula (3) may be any one of a block copolymer, an alternating copolymer, and a random copolymer. A mixture of two or more kinds of compounds different from each other in m and/or n may be used.

In the structural formula (4), m preferably represents an integer of 1 to 10, and n preferably represents an integer of 1 to 10. A mixture of two or more kinds of compounds different from each other in m and/or n may be used.

The content of the compound having a structure represented by any one of the structural formulae (1) to (4) in the aqueous ink is in the range of preferably 0.05 mass % to 5 mass %, or more preferably 0.1 mass % to 2 mass % based on the total mass of the aqueous ink.

<Physical Properties of Ink>

The aqueous ink to be used in the present invention composed of such components as described above preferably has property with which the ink can be favorably ejected from an ink-jet recording head. The ink preferably has properties including a viscosity of 1 to 15 mPa·s (particularly preferably 1 to 5 mPa·s) and a surface tension of 25 mN/m (dyne/cm) or more (particularly preferably 25 to 50 mN/m (dyne/cm)) from the viewpoint of ejection property from an ink-jet recording head.

<Ink Set>

The cyan ink of the present invention is preferably combined with magenta ink, yellow ink, and black ink, each of which contains: water; a water-insoluble coloring material; and plurality of water-soluble organic solvents including a good medium or good mediums for the water-insoluble coloring material and a poor medium or poor mediums for the water-insoluble coloring material, to prepare an ink set having four kinds of aqueous inks.

The term "ink set" as used herein may refer to any one of the forms described below as long as plurality of inks is combined. Examples of the ink set include: an ink set constituted by an ink tank having tanks each storing cyan ink, magenta ink, yellow ink, or black ink integrated with each other or by an ink tank with a head; an ink set constituted by an ink tank having tanks each storing cyan ink, magenta ink, or yellow ink integrated with each other or by an ink tank with a head; and an ink set having individual ink tanks storing such inks as described above detachably attached to a recording apparatus. In any case, in the present invention, the properties of the single ink of the present invention are specified relative to any other ink to be used (in a recording apparatus or as an ink tank). In addition to the forms described above, any modified form is also applicable.

<Ink-jet Recording Method, Recording Unit, Cartridge, and Ink-jet Recording Apparatus>

FIG. 1 shows an example of an ink-jet recording apparatus. In FIG. 1, reference numeral 61 denotes a blade as a wiping member, one end of which is held and fixed by a blade holding member to form a cantilever. The blade 61 is placed at a position adjacent to a recording region provided by a recording head 65. In this example, the blade 61 is held so as to extrude in the moving path of the recording head 65.

Reference numeral 62 denotes a cap of the surface of the extruding port of the recording head 65. The cap 62 is placed at a home position adjacent to the blade 61. The cap 62 moves in the direction perpendicular to the moving direction of the recording head 65 to be in contact with an ink ejection orifice surface to thereby perform capping. Reference numeral 63 denotes an ink absorbent arranged so as to be adjacent to the blade 61. As in the case of the blade 61, the ink absorbent 63 is held so as to extrude in the moving path of the recording head 65. The blade 61, the cap 62, and the ink absorbent 63 constitute an ejection recovery portion 64. Moisture content, dust, and the like on the ejection orifice surface are removed by the blade 61 and the ink absorbent 63. A recovery unit is also constituted, in which ink or the like placed at an ejection orifice for each ink of the recording head is sucked by a pump (not shown) via the cap to recover the ejection performance of ink inherent in the recording head.

Reference numeral 65 denotes the recording head for performing recording by ejecting ink to a recording medium opposed to an ejection orifice surface provided with an ejection orifice, the recording head having ejection energy generating means. Reference numeral 66 denotes a carriage for moving the recording head 65 mounted thereon. The carriage 66 is slidably engaged with a guide shaft 67, and part of the carriage 66 is connected (not shown) to a belt 69 driven by a motor 68. Thus, the carriage 66 can move along the guide shaft 67. The carriage 66 can move in the recording region provided by the recording head 65 and a region adjacent to the recording region.

Reference numeral 51 denotes a sheet-feeding portion into which a recording medium is inserted, and reference numeral 52 denotes a sheet-feeding roller to be driven by a motor (not shown). With such constitution, the recording medium is fed to a position opposed to the ejection orifice surface of the recording head 65. As recording proceeds, the recording medium is discharged to a sheet-discharge portion equipped with a sheet-discharge roller 53. In the above constitution, when the recording head 65 returns to its home position after the completion of the recording, the cap 62 of the ejection recovery portion 64 evacuates from the moving path of the recording head 65, while the blade 61 extrudes in the moving path. As a result, the ejection orifice of the recording head 65 is wiped.

When the cap 62 contacts with the ejection orifice surface of the recording head 65 to perform capping, the cap 62 moves to extrude in the moving path of the recording head. When the recording head 65 moves from its home position to a recording starting position, the cap 62 and the blade 61 are each placed at the same position as that at the time of wiping. As a result, the ejection orifice surface of the recording head 65 is also wiped through this movement. The above-described movement of the recording head to its home position occurs upon completion of the recording and at the time of ejection recovery. In addition, while the recording head moves in the recording region for recording, the recording head moves to its home position adjacent to the recording region at a predetermined interval. In association with the movement, the above wiping is performed.

<Image Forming Method>

Hereinafter, an image forming method according to the present invention will be described by way of a specific example. The image forming method according to the present invention is an image forming method including performing recording by means of black ink and at least one color ink on a recording medium such as plain paper according to an ink-jet recording method, characterized in that, when an image formed by the black ink and an image formed by the color ink are adjacent to each other to form an image, performing scanning for applying the black ink to form an image and thereafter performing scanning for applying the color ink to the area where the image has been formed by the precedent scanning. Hereinafter, a specific approach will be described.

Figure 2:
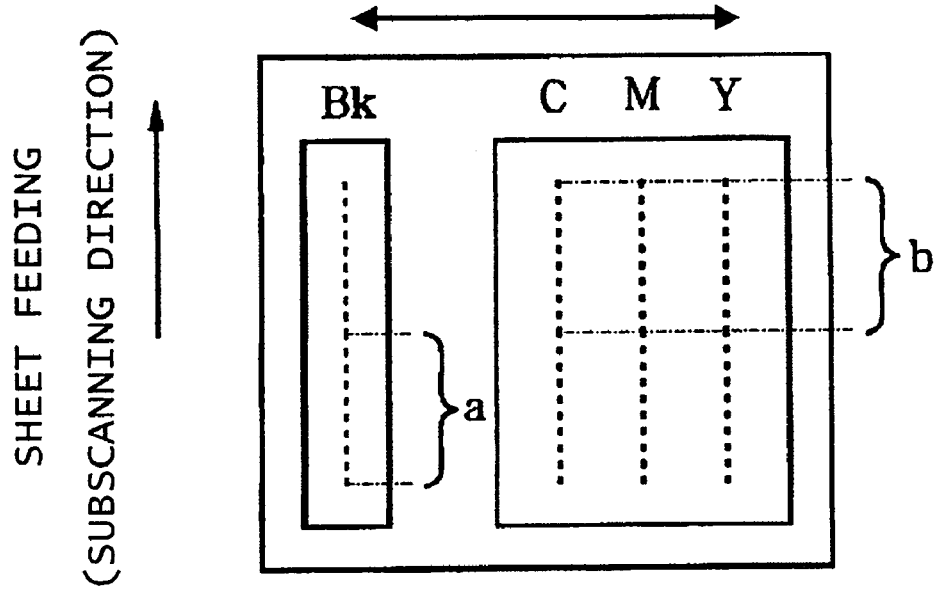
FIG. 2 is a view showing an example of the constitution of a recording head.

FIG. 2 shows an example of a recording head to be used for performing the image forming method according to the present invention. As shown in FIG. 2, the recording head includes an ejection orifice line (Bk) for ejecting a black ink and ejection orifice lines for ejecting three color inks, that is, a cyan (C) ink, a magenta (M) ink, and a yellow (Y) ink.

In the image forming method of the present invention, a recording head in which an ejection orifice line for black ink for ejecting a black ink and an ejection orifice line for color ink for ejecting a color ink are arranged so as to shift from each other in a subscanning direction is preferably used for forming a full-color image. To be specific, for example, when the recording head shown in FIG. 2 is used to form an image, the entire region of the ejection orifice line for black ink is preferably used for the formation of an image composed only of a black color, while, when a full-color image in which a black image and a color image are present is to be formed, the part a of the ejection orifice line for black ink is preferably used for the black ink and the part b of the ejection orifice lines for color ink is preferably used for the color inks of C, M, and Y to form an image. Hereinafter, the formation of an image in which a black image and a color image are present will be described in more detail.

FIG. 2 shows an example of a recording head that can be used in the present invention. The recording head includes an ejection orifice line (Bk) for ejecting a black ink and ejection orifice lines for ejecting three color inks, that is, a cyan (C) ink, a magenta (M) ink, and a yellow (Y) ink. At first, the part a of the ejection orifice line for black ink is used to scan a print head in the horizontal direction in the figure (main-scanning direction), whereby a black image is formed through one-path printing on a recording medium. Next, the recording medium is conveyed in the vertical direction in the figure (subscanning direction) by a distance of a. During the process of the subsequent main scanning of the print head in an approaching direction, the part b of the ejection orifice lines for color ink is used to form a color image through one-path printing in the region where the image has been formed by the part a of the ejection orifice line for black ink. At this time, the part a of the ejection orifice line for black ink forms an image in a subsequent region. An image in which a black image and a color image are present is formed through the repetition of the above procedure.

Figure 3:
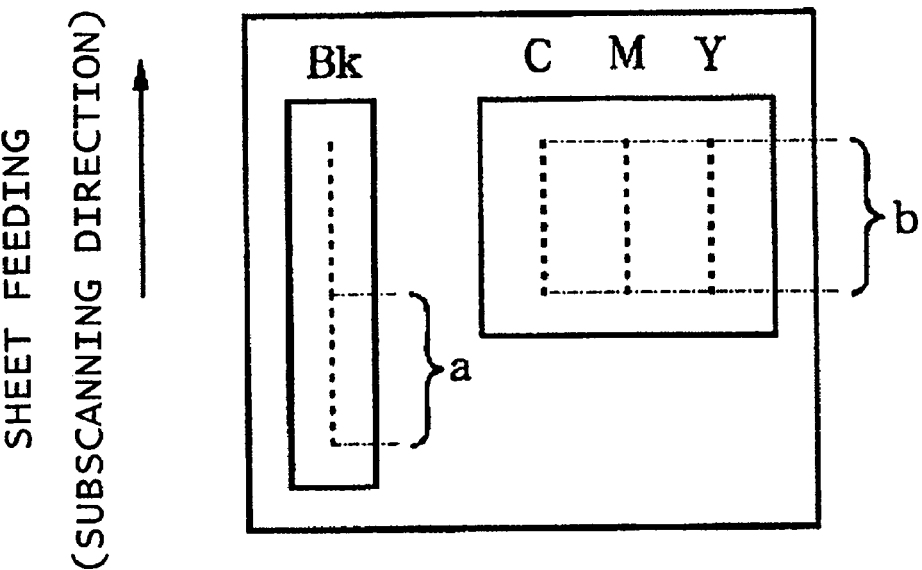
FIG. 3 is a view showing an example of the constitution of a recording head.

FIG. 3 shows another example of a recording head that can be used in the present invention. As in the case of FIG. 2, in FIG. 3 as well, the part a of the ejection orifice line for black ink is used for a black ink and the part b corresponding to the entire region of the ejection orifice lines for color ink is used for color inks of C, M, and Y. Then, in the same manner as that described above, an image in which a black image and a color image are present is formed.

Figure 4:
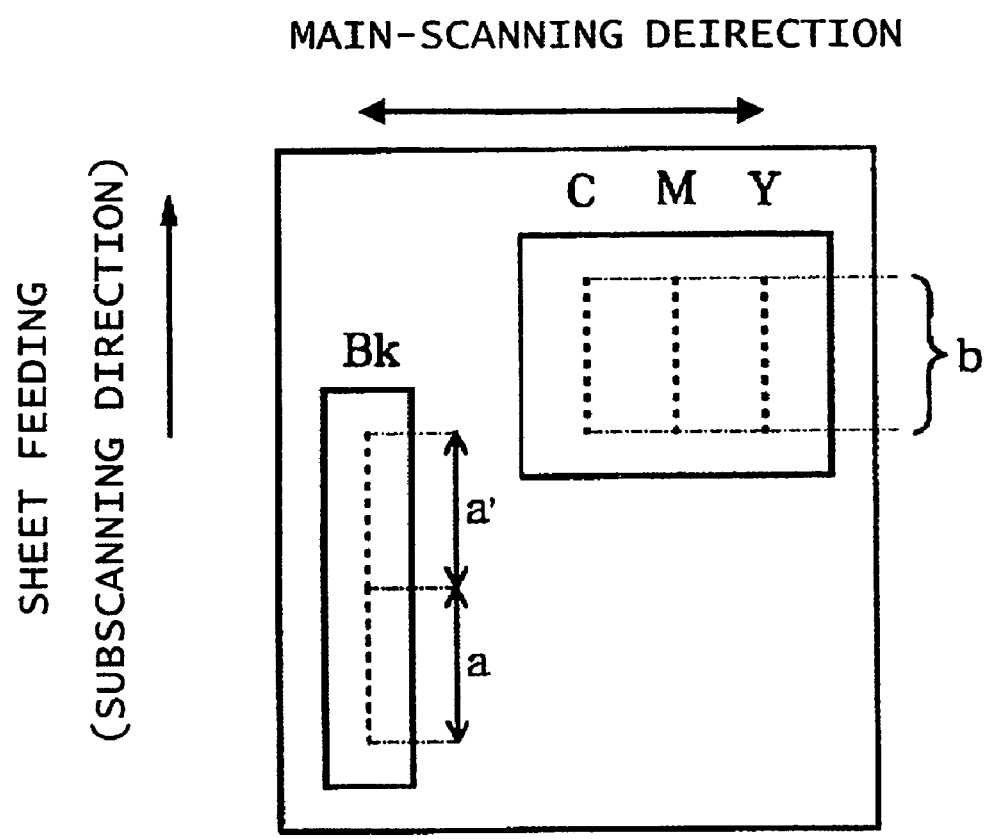
FIG. 4 is a view showing an example of the constitution of a recording head.

FIG. 4 shows another example of a recording head that can be used in the present invention. As in the case of FIG. 2, in FIG. 4 as well, the part a of the ejection orifice line for black ink is used for a black ink and the part b corresponding to the entire region of the ejection orifice lines for color ink is used for color inks of C, M, and Y. Then, an image in which a black image and a color image are present is formed. In the recording head shown in FIG. 4, the part a of the ejection orifice line for black ink and the part b of the ejection orifice lines for color ink are distant from each other by an amount a' for single sheet feeding. For this reason, in the recording head having such constitution, a time difference for one scan is excessively generated by a reciprocation during the time period commencing on the formation of a black image and ending on the formation of a color image. Therefore, the constitution of the recording head shown in FIG. 4 more effectively prevents bleeding between a black image and a color image than the constitution of the recording head shown in FIG. 3.

Figure 5:
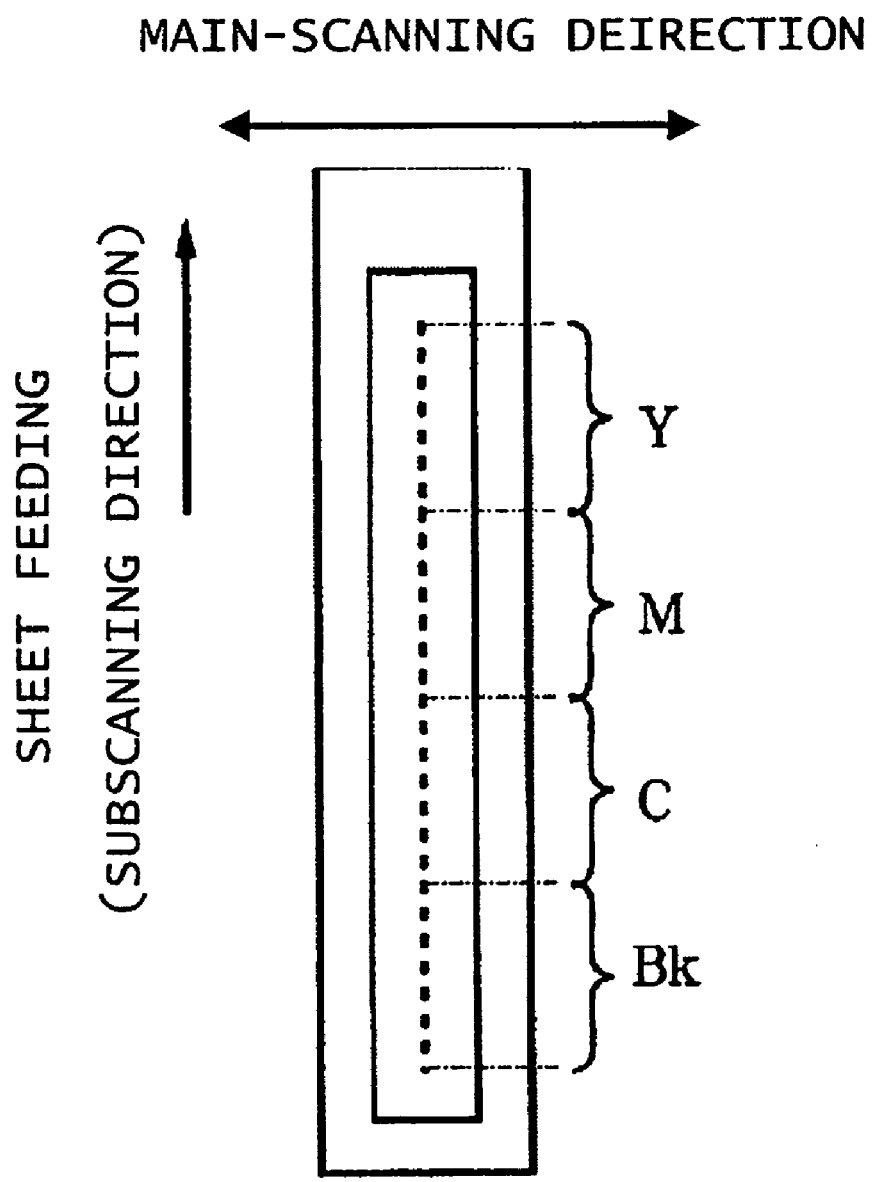
FIG. 5 is a view showing an example of the constitution of a recording head.

FIG. 5 shows another example of a recording head that can be used in the present invention. In the case where a recording head as shown in FIG. 5 in which ejection orifice lines for black and color inks are arranged in order in a single file in a subscanning direction is used, a color image is formed after a black image has been formed in accordance with sheet feeding.

Figure 6:
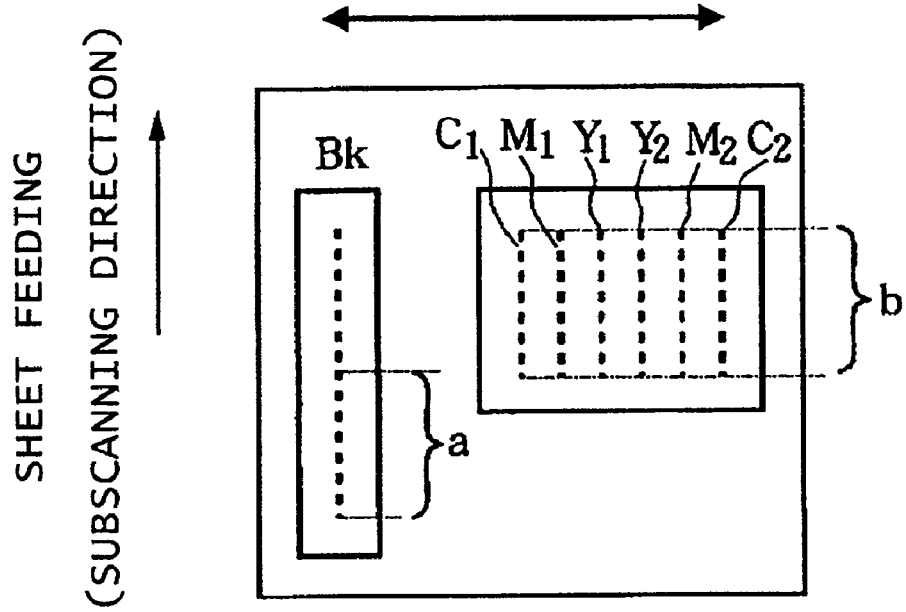
FIG. 6 is a view showing an example of the constitution of a recording head.

FIG. 6 shows another example of a recording head that can be used in the present invention. The recording head shown in FIG. 6 has two ejection orifice lines for each of cyan ink (C1 and C2), magenta ink (M1 and M2), and yellow ink (Y1 and Y2) arranged so as to be symmetric with respect to each other in the main-scanning direction in such a manner that the order of impact of color ink of scanning in an approaching direction and that of scanning in a returning direction are identical to each other. As a result, bidirectional printing can be performed even in the formation of an image in which a black image and a color image are present. In this case, at first, a black image is formed by the part a of the ejection orifice for black ink and then a recording medium is conveyed by a distance of a in the subscanning direction. During the process of the subsequent main scanning of a print head in the returning direction, the part b of the ejection orifice lines for color ink is used to form a color image through one-path printing in the image region where the image has been formed by the part a of the ejection orifice line for black ink. At this time, the part a of the ejection orifice line for black ink forms an image in a subsequent region. An image in which a black image and a color image are present is formed through the repetition of the above procedure.

Figure 7:
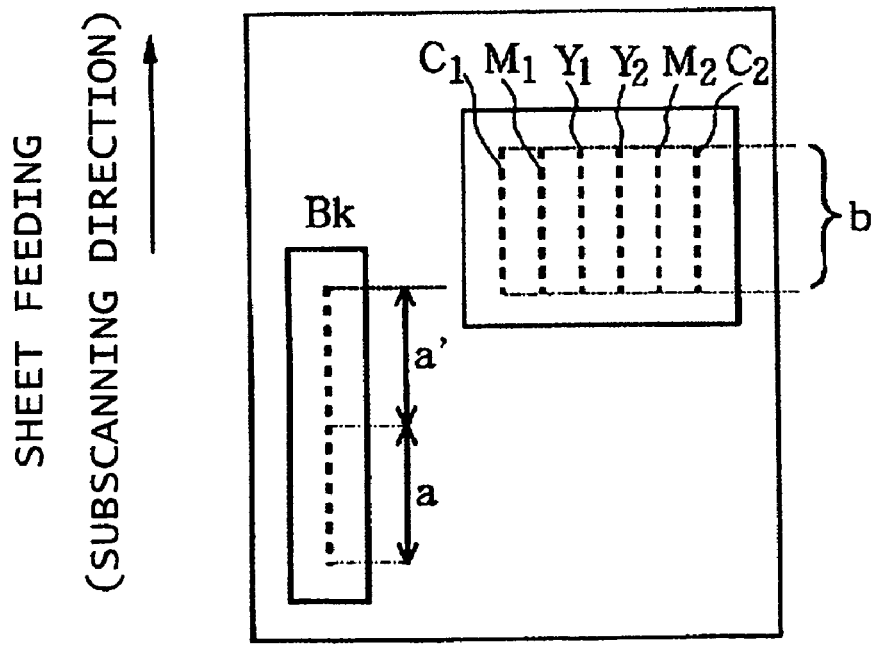
FIG. 7 is a view showing an example of the constitution of a recording head.
Figures 9A, 9B:
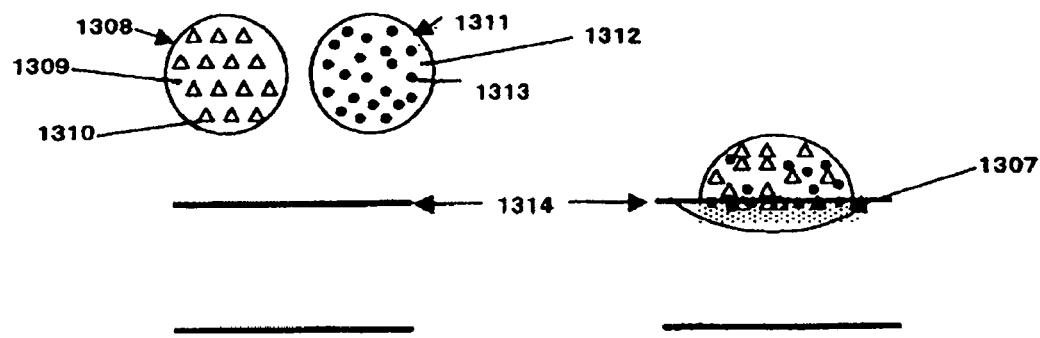
Figures 9C, 9D:
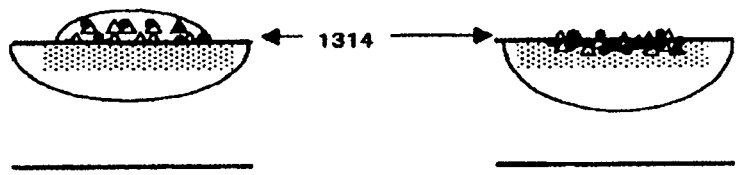

Even in such recording head corresponding to bidirectional printing as shown in FIG. 6, as in the case of the recording head described with reference to FIG. 4, the part a of the ejection orifice line for black ink and the part b of the ejection orifice lines for color ink may be distant from each other by an amount a' for single sheet feeding (see FIG. 7), and a time difference for one scan may be generated by a reciprocation during the time period commencing on the formation of a black image and ending on the formation of a color image, to thereby prevent bleeding between a black image and a color image with improved effectiveness.

The image forming method according to the present invention has been described above. Of course, the form of a recording head that can be used for the image forming method according to the present invention is not limited to those shown in FIGS. 2 to 7. In addition, printing is not limited to one-path printing because the number of paths differs from recording apparatus to recording apparatus.

<Recording Medium>

Any recording medium can be used for forming an image by means of the aqueous ink of the present invention as long as ink is applied to the recording medium to perform recording. In particular, in the present invention, for example, plain paper or a recording medium having on at least one of its surfaces a coating layer for receiving aqueous ink is preferably used. Of course, the present invention is not limited thereto.

An example of the recording medium having a coating layer for receiving aqueous ink includes a recording medium having, on at least one of its surfaces each containing at least a hydrophilic polymer and/or an inorganic porous body, a coating layer for receiving aqueous ink. The formation of an image on such recording medium exerts a particularly excellent effect. There are various kinds of recording media each having a coating layer for receiving aqueous ink depending on, for example, a surface state, the thickness of the coating layer, the size of a pore for absorbing the aqueous ink, a difference in material constituting an ink-absorbing layer, and the kind of substrate. Examples of such recording media include: high glazed paper and a glossy film each having high surface gloss; lightly glossy paper, semi-gloss paper, and mat paper with no gloss each of which has surface gloss adjusted through processing or the like; and lightly coated paper with a small amount of coating layer.

A recording medium to be used for ink-jet recording is selected from various media depending on a purpose. For example, glossy paper for obtaining an image having gloss comparable to that of silver halide photographic paper, or art paper utilizing the feeling of a substrate (such as a printing paper tone, canvas tone, or Japanese paper tone) for representing a drawing, a photograph, a graphic image, or the like as one likes has been used.

Any conventionally known substance can be used for the hydrophilic polymer constituting the coating layer of the above-described recording medium. Examples thereof include starch, carboxymethylcellulose, methylcellulose, hydroxyethylcellulose, hydroxypropylcellulose, alginic acid, gelatin, polyvinyl alcohol, polyvinyl acetal, polyethylene oxide, sodium polyacrylate, cross-linked polyacrylic acid, polyvinyl methyl ether, polystyrenesulfonic acid, quaternary polyvinyl pyridine, polyacrylamide, polyvinyl pyrrolidone, polyamine, an aqueous urethane resin, a water-soluble acrylic resin, a water-soluble epoxy compound, and water-soluble polyester. Denatured products of the above polymers such as ion-denatured products including cation-denatured polyvinyl alcohol and cation-denatured polyvinyl pyrrolidone can also be appropriately used. Examples of the inorganic porous body to be used for constituting the ink-receiving layer of the above-described recording medium include silica gel, alumina, zeolite, and porous glass.

EXAMPLES

Hereinafter, the present invention will be described more specifically by way of examples, comparative examples, and reference examples. The present invention is not limited to the following examples without departing from the gist of the present invention. The terms "part" and "%" in the following description are on a mass basis unless otherwise stated.

<Preparation of Pigment Dispersion Solution and Reaction Liquid>

(Preparation of Black Pigment Dispersion Solution)

10 parts of carbon black having a specific surface area of 210 $m^2/g$ and a DBP oil absorption of 74 ml/100 g, 20 parts of an aqueous solution prepared by neutralizing a styrene-acrylic acid copolymer having an acid value of 200 and a weight average molecular weight of 10,000 with a 10-mass % aqueous solution of sodium hydroxide, and 70 parts of ion-exchanged water were mixed, and the mixture was dispersed for 3 hours by means of a batch-type vertical sand mill. The resultant dispersion solution was centrifuged to remove coarse particles. After that, the remainder was filtered through a microfilter having a pore size of 3.0 μm (manufactured by Fuji Photo Film Co., Ltd.) under pressure to prepare a resin-dispersion black pigment. Then, water was added to disperse the resin-dispersion black pigment thus prepared to attain a pigment concentration of 10 mass %, thereby preparing a dispersion solution. Thus, a black pigment dispersion solution was prepared.

(Preparation of Cyan Pigment Dispersion Solution)

10 parts of a pigment (C.I. Pigment Blue 15:3), 20 parts of an aqueous solution prepared by neutralizing a styrene-acrylic acid copolymer having an acid value of 200 and a weight average molecular weight of 10,000 with a 10-mass % aqueous solution of sodium hydroxide, and 70 parts of ion-exchanged water were mixed, and the mixture was dispersed for 3 hours by means of a batch-type vertical sand mill. The resultant dispersion solution was centrifuged to remove coarse particles. After that, the remainder was filtered through a microfilter having a pore size of 3.0 µm (manufactured by Fuji Photo Film Co., Ltd.) under pressure to prepare a resin-dispersion cyan pigment. Then, water was added to disperse the resin-dispersion cyan pigment thus prepared to attain a pigment concentration of 10 mass %, thereby preparing a dispersion solution. Thus, a cyan pigment dispersion solution was prepared.

(Preparation of Magenta Pigment Dispersion Solution)

10 parts of a pigment (C.I. Pigment Red 122), 20 parts of an aqueous solution prepared by neutralizing a styrene-acrylic acid copolymer having an acid value of 200 and a weight average molecular weight of 10,000 with a 10-mass % aqueous solution of sodium hydroxide, and 70 parts of ion-exchanged water were mixed, and the mixture was dispersed for 3 hours by means of a batch-type vertical sand mill. The resultant dispersion solution was centrifuged to remove coarse particles. After that, the remainder was filtered through a microfilter having a pore size of 3.0 µm (manufactured by Fuji Photo Film Co., Ltd.) under pressure to prepare a resin-dispersion magenta pigment. Then, water was added to disperse the resin-dispersion magenta pigment thus prepared to attain a pigment concentration of 10 mass %, thereby preparing a dispersion solution. Thus, a magenta pigment dispersion solution was prepared.

(Preparation of Yellow Pigment Dispersion Solution)

10 parts of a pigment (C.I. Pigment Yellow 74), 20 parts of an aqueous solution prepared by neutralizing a styrene-acrylic acid copolymer having an acid value of 200 and a weight average molecular weight of 10,000 with a 10-mass % aqueous solution of sodium hydroxide, and 70 parts of ion-exchanged water were mixed, and the mixture was dispersed for 3 hours by means of a batch-type vertical sand mill. The resultant dispersion solution was centrifuged to remove coarse particles. After that, the remainder was filtered through a microfilter having a pore size of 3.0 µm (manufactured by Fuji Photo Film Co., Ltd.) under pressure to prepare a resin-dispersion yellow pigment. Then, water was added to disperse the resin-dispersion yellow pigment thus prepared to attain a pigment concentration of 10 mass %, thereby preparing a dispersion solution. Thus, a yellow pigment dispersion solution was prepared.

<Method of Judging on Good Medium and Poor Medium in Water-soluble Organic Solvents>

The following experiment was performed in order to select a water-soluble organic solvent to act as a good medium or a poor medium for the pigment in each of the above pigment dispersion solutions. First, aqueous solutions of the respective pigment dispersion solutions thus prepared each having a solid concentration of 10 mass % were prepared. A solvent-judgment dispersion solution A and a solvent-judgment water dispersion solution B for judgment on a good medium and a poor medium were prepared by using the aqueous solutions and the respective water-soluble organic solvents at the following compounding ratios.

(Solvent-judgment Dispersion Solution A)

Each color pigment dispersion solution having solid concentration of 10 mass %: 50 parts Each water-soluble organic solvent shown in Table 1: 50 parts (Solvent-judgment Water Dispersion Solution B)

Each color pigment dispersion solution having solid concentration of 10 mass %: 50 parts Pure water: 50 parts (Determination Method)

Next, 10 g of the dispersion solution A for judgment on a good medium and a poor medium thus prepared were charged into a transparent sample bottle made of glass and equipped a cap. After the bottle had been capped, the dispersion solution was sufficiently stirred, and the bottle was left standing in an oven at 60° C. for 48 hours. After that, the dispersion solution taken out of the oven was provided as a sample for measurement, and the average particle size of the pigment in the dispersion solution was measured with a fiber-optics particle analyzer (trade name: FPAR-1000; manufactured by Otsuka Electronics Co., Ltd.). The measured particle size was defined as the average particle size of the dispersion solution A for judgment after storage at 60° C. for 48 hours (average particle size of the pigment measured without dilution). Meanwhile, the water dispersion solution B for judgment was not stored under heat, and the average particle size of the pigment in the dispersion solution was measured with the fiber-optics particle analyzer in the same manner as that described above. Then, when the average particle size of the pigment in the dispersion solution A was larger than that of the pigment in the water dispersion solution B, a water-soluble organic solvent was determined to be a poor medium. When the average particle size of the pigment in the dispersion solution A was equal to or smaller than that of the pigment in the water dispersion solution B, a water-soluble organic solvent was determined to be a good medium.

<Measurement of Ka Value for Water-soluble Organic Solvent>

First, in measuring the Ka value of each water-soluble organic solvent, a dye aqueous solution at a dye concentration of 0.5 mass % having the following composition was prepared. Such dye aqueous solution was used for visualizing a colorless and transparent sample by staining the sample, to thereby facilitate the measurement of the Ka value.

Water-soluble dye C.I. Direct Blue 199: 0.5 part

Pure water: 99.5 parts

Next, a 20% aqueous solution of each water-soluble organic solvent to be measured stained with the 0.5 mass % dye aqueous solution and having the following composition was prepared.

0.5 mass % dye aqueous solution: 80 parts

Water-soluble organic solvent shown in Table 1: 20 parts

The Ka value of the 20 mass % aqueous solution of each water-soluble organic solvent thus prepared as a sample for measurement was measured by means of a dynamic permeability tester (trade name: Dynamic permeability tester S; manufactured by Toyo Seiki Seisaku-Sho, Ltd.) according to the Bristow method.

<Results of Judgment and Measurements>

Table 1 shows the results of judgment as to whether each water-soluble organic solvent that can be used for ink thus measured is a good medium or a poor medium for any one of the black pigment dispersion solution, the cyan pigment dispersion solution, the magenta pigment dispersion solution, and the yellow pigment dispersion solution, and shows the measurement of the Ka value of each water-soluble organic solvent in a 20 mass % aqueous solution. 'o' and 'x' in the table represent a good medium and a poor medium, respectively.

TABLE 1

| Water-soluble organic solvent | Water-insoluble coloring material | | | | Ka value of 20-mass % aqueous solution of water-soluble organic solvent [ml/m²/msec^{1/2}] |
|---|---|---|---|---|---|
| | Black pigment dispersion solution | Cyan pigment dispersion solution | Magenta pigment dispersion solution | Yellow pigment dispersion solution | |
| Glycerin | ○ | ○ | ○ | ○ | 0.13 |
| Trimethylolpropane | ○ | ○ | ○ | ○ | 0.19 |
| Polyethylene glycol 600 | x | x | x | x | 0.17 |

<Preparation of Ink>

Examples 1 to 4

The respective components shown in each of Tables 2 to 5 below were mixed and sufficiently stirred. After that, the resultant was filtered through a microfilter having a pore size of 3.0 μm (manufactured by Fuji Photo Film Co., Ltd.) under pressure to prepare each aqueous ink and an ink set of each of Examples 1 to 4. The B/A value in each table is obtained by dividing the total content (mass %) of the poor medium in each aqueous ink, which is denoted by B, by the total content (mass %) of the good medium in the ink, which is denoted by A. In preparing the aqueous ink of each example, the B/A value was adjusted to be 0.5 or more and 3.0 or less, and the cyan ink was adjusted to have the minimum B/A value out of the aqueous inks in each ink set.

TABLE 2

| | Example 1 | | | |
|---|---|---|---|---|
| | Black Ink | Cyan Ink | Magenta Ink | Yellow Ink |
| Black pigment dispersion solution | 50.0 | | | |
| Cyan pigment dispersion solution | | 50.0 | | |
| Magenta pigment dispersion solution | | | 50.0 | |
| Yellow pigment dispersion solution | | | | 50.0 |
| Glycerin | 10.0 | 13.0 | 10.0 | 10.0 |
| Polyethylene glycol 600 | 10.0 | 7.0 | 10.0 | 10.0 |
| Acetylenol E-100 (*) | 0.1 | 0.1 | 0.1 | 0.1 |
| Pure water | Balance | Balance | Balance | Balance |
| B/A value | 1.00 | 0.54 | 1.00 | 1.00 |

(*) Ethylene oxide adduct of acetylene glycol (surfactant; manufactured by Kawaken Fine Chemicals Co., Ltd.)

TABLE 3

| | Example 2 | | | |
|---|---|---|---|---|
| | Black Ink | Cyan Ink | Magenta Ink | Yellow Ink |
| Black pigment dispersion solution | 50.0 | | | |
| Cyan pigment dispersion solution | | 50.0 | | |
| Magenta pigment dispersion solution | | | 50.0 | |
| Yellow pigment dispersion solution | | | | 50.0 |
| Glycerin | 10.0 | 11.0 | 10.0 | 10.0 |
| Polyethylene glycol 600 | 10.0 | 9.0 | 10.0 | 10.0 |
| Acetylenol E-100 (*) | 0.1 | 0.1 | 0.1 | 0.1 |
| Pure water | Balance | Balance | Balance | Balance |
| B/A value | 1.00 | 0.82 | 1.00 | 1.00 |

(*) Ethylene oxide adduct of acetylene glycol (surfactant; manufactured by Kawaken Fine Chemicals Co., Ltd.)

TABLE 4

| | Example 3 | | | |
|---|---|---|---|---|
| | Black Ink | Cyan Ink | Magenta Ink | Yellow Ink |
| Black pigment dispersion solution | 50.0 | | | |
| Cyan pigment dispersion solution | | 50.0 | | |
| Magenta pigment dispersion solution | | | 50.0 | |
| Yellow pigment dispersion solution | | | | 50.0 |
| Glycerin | 10.0 | 13.0 | 11.0 | 10.0 |
| Polyethylene glycol 600 | 10.0 | 7.0 | 9.0 | 10.0 |
| Acetylenol E-100 (*) | 0.1 | 0.1 | 0.1 | 0.1 |
| Pure water | Balance | Balance | Balance | Balance |
| B/A value | 1.00 | 0.54 | 0.82 | 1.00 |

(*) Ethylene oxide adduct of acetylene glycol (surfactant; manufactured by Kawaken Fine Chemicals Co., Ltd.)

TABLE 5

Example 4

|  | Black Ink | Cyan Ink | Magenta Ink | Yellow Ink |
|---|---|---|---|---|
| Black pigment dispersion solution | 50.0 | | | |
| Cyan pigment dispersion solution | | 50.0 | | |
| Magenta pigment dispersion solution | | | 50.0 | |
| Yellow pigment dispersion solution | | | | 50.0 |
| Glycerin | 6.0 | 4.0 | 7.0 | 6.0 |
| Polyethylene glycol 600 | 9.0 | 3.5 | 11.0 | 9.0 |
| Acetylenol E-100 (*) | 0.1 | 0.1 | 0.1 | 0.1 |
| Pure water | Balance | Balance | Balance | Balance |
| B/A value | 1.50 | 0.88 | 1.57 | 1.50 |

(*) Ethylene oxide adduct of acetylene glycol (surfactant; manufactured by Kawaken Fine Chemicals Co., Ltd.)

Reference Examples 1 and 2

The respective components shown in each of Tables 6 and 7 below were mixed and sufficiently stirred. After that, the resultant was filtered through a microfilter having a pore size of 3.0 μm (manufactured by Fuji Photo Film Co., Ltd.) under pressure to prepare each aqueous ink and an ink set of each of Reference Examples 1 and 2. The B/A value in each table is obtained by dividing the total content (mass %) of the poor medium in each aqueous ink, which is denoted by B, by the total content (mass %) of the good medium in the ink, which is denoted by A. In preparing the aqueous ink of each example, the B/A value was adjusted to be 0.5 or more and 3.0 or less.

TABLE 6

Reference Example 1

|  | Black Ink | Cyan Ink | Magenta Ink | Yellow Ink |
|---|---|---|---|---|
| Black pigment dispersion solution | 50.0 | | | |
| Cyan pigment dispersion solution | | 50.0 | | |
| Magenta pigment dispersion solution | | | 50.0 | |
| Yellow pigment dispersion solution | | | | 50.0 |
| Glycerin | 10.0 | 10.0 | 8.0 | 10.0 |
| Polyethylene glycol 600 | 10.0 | 10.0 | 10.0 | 9.0 |
| Acetylenol E-100 (*) | 0.1 | 0.1 | 0.1 | 0.1 |
| Pure water | Balance | Balance | Balance | Balance |
| B/A value | 1.00 | 1.00 | 1.25 | 0.90 |

(*) Ethylene oxide adduct of acetylene glycol (surfactant; manufactured by Kawaken Fine Chemicals Co., Ltd.)

TABLE 7

Reference Example 2

|  | Black Ink | Cyan Ink | Magenta Ink | Yellow Ink |
|---|---|---|---|---|
| Black pigment dispersion solution | 50.0 | | | |
| Cyan pigment dispersion solution | | 50.0 | | |
| Magenta pigment dispersion solution | | | 50.0 | |
| Yellow pigment dispersion solution | | | | 50.0 |
| Glycerin | 10.0 | 9.0 | 10.0 | 10.0 |
| Polyethylene glycol 600 | 10.0 | 11.0 | 10.0 | 10.0 |
| Acetylenol E-100 (*) | 0.1 | 0.1 | 0.1 | 0.1 |
| Pure water | Balance | Balance | Balance | Balance |
| B/A value | 1.00 | 1.22 | 1.00 | 1.00 |

(*) Ethylene oxide adduct of acetylene glycol (surfactant; manufactured by Kawaken Fine Chemicals Co., Ltd.)

Comparative Examples 1 to 3

The respective components shown in each of Tables 8 to 10 below were mixed and sufficiently stirred. After that, the resultant was filtered through a microfilter having a pore size of 3.0 μm (manufactured by Fuji Photo Film Co., Ltd.) under pressure to prepare each aqueous ink and an ink set of each of Comparative Examples 1 to 3. The B/A value in each table is obtained by dividing the total content (mass %) of the poor medium in each aqueous ink, which is denoted by B, by the total content (mass %) of the good medium in the ink, which is denoted by A.

TABLE 8

Comparative Example 1

|  | Black Ink | Cyan Ink | Magenta Ink | Yellow Ink |
|---|---|---|---|---|
| Black pigment dispersion solution | 50.0 | | | |
| Cyan pigment dispersion solution | | 50.0 | | |
| Magenta pigment dispersion solution | | | 50.0 | |
| Yellow pigment dispersion solution | | | | 50.0 |
| Glycerin | 10.0 | 16.0 | 10.0 | 10.0 |
| Polyethylene glycol 600 | 10.0 | 5.0 | 10.0 | 10.0 |
| Acetylenol | 0.1 | 0.1 | 0.1 | 0.1 |
| Pure water | Balance | Balance | Balance | Balance |
| B/A value | 1.00 | 0.31 | 1.00 | 1.00 |

(*) Ethylene oxide adduct of acetylene glycol (surfactant; manufactured by Kawaken Fine Chemicals Co., Ltd.)

TABLE 9

Comparative Example 2

| | Black Ink | Cyan Ink | Magenta Ink | Yellow Ink |
|---|---|---|---|---|
| Black pigment dispersion solution | 50.0 | | | |
| Cyan pigment dispersion solution | | 50.0 | | |
| Magenta pigment dispersion solution a | | | 50.0 | |
| Yellow pigment dispersion solution | | | | 50.0 |
| Glycerin | 10.0 | 4.5 | 10.0 | 10.0 |
| Polyethylene glycol 600 | 10.0 | 16.0 | 10.0 | 10.0 |
| Acetylenol E-100 (*) | 0.1 | 0.1 | 0.1 | 0.1 |
| Pure water | Balance | Balance | Balance | Balance |
| B/A value | 1.00 | 3.56 | 1.00 | 1.00 |

(*) Ethylene oxide adduct of acetylene glycol (surfactant; manufactured by Kawaken Fine Chemicals Co., Ltd.)

TABLE 10

Comparative Example 3

| | Black Ink | Cyan Ink | Magenta Ink | Yellow Ink |
|---|---|---|---|---|
| Black pigment dispersion solution | 50.0 | | | |
| Cyan pigment dispersion solution | | 50.0 | | |
| Magenta pigment dispersion solution | | | 50.0 | |
| Yellow pigment dispersion solution | | | | 50.0 |
| Glycerin | 10.0 | 8.0 | 10.0 | 10.0 |
| Trimethylolpropane | | 5.0 | | |
| Polyethylene glycol 600 | 10.0 | 7.0 | 10.0 | 10.0 |
| Acetylenol E-100 (*) | 0.1 | 0.1 | 0.1 | 0.1 |
| Pure water | Balance | Balance | Balance | Balance |
| B/A value | 1.00 | 0.54 | 1.00 | 1.00 |

(*) Ethylene oxide adduct of acetylene glycol (surfactant; manufactured by Kawaken Fine Chemicals Co., Ltd.)

<Evaluation 1: Image Density>

A recorded article was produced by means of the ink of each of Examples 1 to 3, Reference Examples 1 and 2, and Comparative Examples 1 to 3 thus prepared. A reconstructed apparatus of an ink-jet recording apparatus PIXUS 950i (manufactured by CANON Inc.) having an on-demand multi-recording head for ejecting ink by applying thermal energy to the ink in accordance with a recording signal was used for the production of the recorded article. To be specific, a letter measuring 2 cm×2 cm including a solid print portion was printed on any one of the following recording media to produce a recorded article. After the resultant recorded article had been left for 1 day, the image density of a solid print portion was measured. The image density was measured by means of a reflection densitometer (trade name: Macbeth RD-918; manufactured by GRETAG-MACBETH). The evaluation criteria for an image density are as follows. Table 11 shows the results of the evaluation.

A default mode was selected for a printer driver. Setting conditions for the default mode are as follows.

Kind of paper: Plain paper
Printing quality: Standard
Color adjustment: Automatic
The following plain papers were used as recording media.
PPC paper PB Paper (manufactured by CANON Inc.)
PPC paper SC250C (manufactured by CANON Inc.)
PPC paper 4200 (manufactured by Fuji Xerox Co., Ltd.)
PPC paper 4024 (manufactured by Fuji Xerox Co., Ltd.)
Highly white paper SW-101 (manufactured by CANON Inc.)

(Evaluation Criteria)
AA: Each paper has a sufficient image density.
A: Some papers have slightly low image densities, but have no problem in practical use.
B: Some papers do not have sufficient image densities.
C: Nearly no paper has a sufficient image density.

<Evaluation 2: Storage Stability>

The ink of each of Examples 1 to 4, Reference Examples 1 and 2, and Comparative Examples 1 to 3 thus prepared was charged into a shot bottle, and the bottle was tightly stopped. After the bottle had been stored in an oven at 60° C. for 2 weeks, the state of the ink was observed. The evaluation criteria for storage stability are as follows. Table 11 shows the results of the evaluation.

(Evaluation Criteria)
A: A coloring material is uniformly and stably dispersed in ink.
B: Ink is gelled, the upper portion of the ink is transparent, or the ink is apparently thickened.

<Evaluation 3: Scratch Resistance>

Out of the respective ink sets of Examples 1 to 4, Reference Examples 1 and 2, and Comparative Examples 1 to 3 thus prepared, three kinds of inks (cyan ink, magenta ink, and yellow ink) were combined to produce a recorded article on which an image having a secondary color had been printed. A reconstructed apparatus of an ink-jet recording apparatus BJF 930 (manufactured by CANON Inc.) having an on-demand multi-recording head for ejecting ink by applying thermal energy to the ink in accordance with a recording signal was used for the production of the recorded article. To be specific, solid images of green and blue each measuring 1 inch×0.5 inch were printed on a recording medium (PPC paper PB Paper; manufactured by CANON Inc.). At the time of printing, ink having low brightness, that is, cyan ink was applied to the recording medium ahead of any other ink. Three kinds of ratios between amounts of the respective inks applied (1:1, 2:1, and 1:2), and an application amount of ink of 14.4 g/m² were set. After the resultant recorded article had been left for 10 minutes, lens-cleaning paper and a weight having a contact pressure of 40 g/cm² were placed on the solid images of the printed article, and then the recording medium was scratched with the lens-cleaning paper. Then, the lens-cleaning paper and the weight were removed, and the degree of contamination of the solid images and the transfer to a white portion were visually observed. The evaluation criteria for scratch resistance are as follows. Table 11 shows the results of the evaluation.

(Evaluation Criteria)
AA: Each of the green image and the blue image shows neither contamination of a white portion nor scraping of a solid print portion.
A: One of the green image and the blue image slightly shows the contamination of a white portion or the scraping of a solid print portion.
B: One of the green image and the blue image slightly shows the contamination of a white portion and the scraping of a solid print portion, but has no problem in practical use.

C: Each of the green image and the blue image shows the contamination of a white portion and the scraping of a solid print portion.

TABLE 11

|  |  | Image density | | | | Storage stability | | | | Scratch resistance |
|---|---|---|---|---|---|---|---|---|---|---|
|  |  | Black | Cyan | Magenta | Yellow | Black | Cyan | Magenta | Yellow |  |
| Example | 1 | AA | AA | AA | AA | A | A | A | A | AA |
|  | 2 | AA | AA | AA | AA | A | A | A | A | A |
|  | 3 | AA | A | AA | AA | A | A | A | A | A |
|  | 4 | AA | A | AA | AA | A | A | A | A | AA |
| Reference | 1 | AA | AA | AA | AA | A | A | A | A | B |
| Example | 2 | AA | B | AA | AA | A | A | A | A | B |
| Comparative | 1 | AA | AA | AA | AA | A | C | A | A | AA |
| Example | 2 | AA | C | AA | AA | A | A | A | A | C |
|  | 3 | C | C | C | C | A | A | A | A | AA |

This application claims priority from Japanese Patent Application No. 2004-190545 filed on Jun. 28, 2004, which is hereby incorporated by reference herein.

What is claimed is:

1. An ink set having four kinds of aqueous inks composed of a cyan ink, a magenta ink, a yellow ink, and a black ink, wherein each ink the ink set comprises at least: water; a water-insoluble coloring material; and a plurality of water-soluble organic solvents including (a) a good medium or good mediums for the water-insoluble coloring material and (b) a poor medium or good mediums for the water-insoluble coloring material, wherein:

in the cyan ink, the ratio $B_1/A_1$ is 0.5 or more and 3.0 or less, when $A_1$ denotes the total content (mass %) of the good medium or good mediums in the cyan ink and $B_1$ denotes the total content (mass %) of the poor medium or poor mediums in the cyan ink;

in the cyan ink, a water-soluble organic solvent showing a maximum Ka value out of respective Ka values of the plurality of water-soluble organic solvents as each determined by the Bristow method is the poor medium; and for each aqueous ink in the ink set other than the cyan ink, A and B satisfies the following expression (I), when A denotes the total content (mass %) of the good medium or good mediums in the aqueous ink and B denotes the total content (mass %) of the poor medium or poor mediums in the aqueous ink:

$$(B_1/A_1)/(B/A) < 1 \qquad (I).$$

2. An ink set according to claim 1, wherein the following expression (I') is satisfied $$(B_1/A_1)/(B/A) < 0.6 \qquad (I').$$

3. An ink set according to claim 1, wherein the content (mass %) of the poor medium in the cyan ink is 4 mass % or more based on the total mass of the cyan ink.

4. An image forming method using on ink set, wherein the ink set comprises the ink set according to claim 1.

5. An image forming apparatus using an ink set, wherein the ink set comprises the ink set according to claim 1.

* * * * *

UNITED STATES PATENT AND TRADEMARK OFFICE
CERTIFICATE OF CORRECTION

PATENT NO. : 7,276,110 B2
APPLICATION NO. : 11/313806
DATED : October 2, 2007
INVENTOR(S) : Tsujimura et al.

It is certified that error appears in the above-identified patent and that said Letters Patent is hereby corrected as shown below:

COLUMN 3
Line 43, "satisfies" should read --satisfy--.

COLUMN 12
Line 23, "$(B_1/A_1)/(B/A)<0.6$" should read --$(B_1/A_1)/(B/A)<0.6$   (Í)--.

COLUMN 13
Line 16, "most left" should read --leftmost--.
Line 18, "most right" should read --rightmost--.

COLUMN 35
Line 25, "ink" (first occurrence) should read --ink in--.
Line 29, "good" should read --poor--.

COLUMN 36
Line 2 Claim 1, "satisfies" should read --satisfy--.
Line 26 Claim 2, "satisfied" should read --satisfied:--.

Signed and Sealed this

Nineteenth Day of August, 2008

JON W. DUDAS
*Director of the United States Patent and Trademark Office*